United States Patent
Bergsma et al.

(10) Patent No.: US 11,907,770 B2
(45) Date of Patent: Feb. 20, 2024

(54) METHOD AND APPARATUS FOR VECTORIZED RESOURCE SCHEDULING IN DISTRIBUTED COMPUTING SYSTEMS USING TENSORS

(71) Applicant: HAUWEI CLOUD COMPUTING TECHNOLOGIES CO., LTD., Gui Zhou (CN)

(72) Inventors: Shane Anthony Bergsma, East York (CA); Timothy James Zeyl, Toronto (CA); Lei Guo, Markham (CA); Xiaodi Ke, Markham (CA)

(73) Assignee: HUAWEI CLOUD COMPUTING TECHNOLOGIES CO., LTD., Gui Zhou (CN)

( * ) Notice: Subject to any disclaimer, the term of this patent is extended or adjusted under 35 U.S.C. 154(b) by 382 days.

(21) Appl. No.: 16/575,763

(22) Filed: Sep. 19, 2019

(65) Prior Publication Data
US 2021/0089363 A1    Mar. 25, 2021

(51) Int. Cl.
  *G06F 9/46*    (2006.01)
  *G06F 9/50*    (2006.01)
  *G06F 9/48*    (2006.01)

(52) U.S. Cl.
  CPC .......... *G06F 9/5083* (2013.01); *G06F 9/4881* (2013.01)

(58) Field of Classification Search
  CPC ............................. G06F 9/5083; G06F 9/4881
  See application file for complete search history.

(56) References Cited

U.S. PATENT DOCUMENTS

| | | | |
|---|---|---|---|
| 5,469,542 A * | 11/1995 | Foster | G06F 11/2242 709/224 |
| 6,829,765 B1 | 7/2004 | Chan et al. | |
| 8,418,233 B1 * | 4/2013 | Hughes | H04L 63/10 713/153 |
| 9,081,834 B2 * | 7/2015 | Bhave | G06F 16/25 |

(Continued)

FOREIGN PATENT DOCUMENTS

| | | |
|---|---|---|
| CN | 105956021 A | 9/2016 |
| CN | 106874115 A | 6/2017 |
| CN | 107783840 A | 3/2018 |

OTHER PUBLICATIONS

Fu, Ping ; Li, Junbao ; Feng, Shou ; Schleiss, A.J.; An Accelerator Architecture of Changeable-Dimension Matrix Computing Method for SVM; 2019, vol. 8 (2), p. 143.*

(Continued)

*Primary Examiner* — Bradley A Teets

(57) ABSTRACT

There is provided a method and apparatus for vectorized resource scheduling using multi-dimensional hierarchical arrays with a uniform data type. According to embodiments, the hierarchy of resources may be represented as a multi-dimensional array of a uniform data type in a scheduling context. This data structure is known as a tensor. In various embodiments, a tensor may be used to model each of resource usage, requested resources, resource capabilities, tenant resource usage, etc. There is provided tensor scheduling operations (e.g. tensor scheduling algorithms) to make use of this resource model. Some embodiments may exploit specialized hardware, such as GPUs and tensor-processing units, in order to accelerate the tensor scheduling operations.

19 Claims, 11 Drawing Sheets

(56) References Cited

U.S. PATENT DOCUMENTS

| | | | |
|---|---|---|---|
| 9,553,735 B1* | 1/2017 | Sevindik | H04W 72/005 |
| 10,621,002 B2* | 4/2020 | Lu | G06F 9/5066 |
| 2006/0149765 A1* | 7/2006 | Knoerle | G06F 9/50 |
| 2007/0050588 A1* | 3/2007 | Tabata | G06F 3/0647 |
| | | | 711/165 |
| 2011/0173616 A1* | 7/2011 | Lattmann | H04L 45/028 |
| | | | 718/1 |
| 2013/0346973 A1* | 12/2013 | Oda | G06F 9/5088 |
| | | | 718/1 |
| 2014/0280978 A1* | 9/2014 | Martinez | H04L 43/20 |
| | | | 709/226 |
| 2014/0282520 A1* | 9/2014 | Sabharwal | G06F 9/45558 |
| | | | 718/1 |
| 2017/0153918 A1* | 6/2017 | Guo | G06F 9/5027 |
| 2019/0042933 A1* | 2/2019 | Powell | G06F 16/20 |
| 2019/0245757 A1* | 8/2019 | Meyer | G06F 8/60 |
| 2019/0266019 A1 | 8/2019 | Hirsch | |
| 2020/0301722 A1* | 9/2020 | Li | G06F 12/10 |

OTHER PUBLICATIONS

Bertsekas and Castanon (Bertsekas, Dimitri P., and David A. Castanon. "Parallel synchronous and asynchronous implementations of the auction algorithm." Parallel Computing 17.6-7 (1991): 707-732).

Mao, H., Alizadeh, M., Menache, I. and Kandula, S., Nov. 2016, "Resource management with deep reinforcement learning". In Proceedings of the 15th ACM Workshop on Hot Topics in Networks (pp. 50-56). ACM.

\* cited by examiner

METHOD AND APPARATUS FOR VECTORIZED RESOURCE SCHEDULING IN DISTRIBUTED COMPUTING SYSTEMS USING TENSORS

FIELD OF THE INVENTION

The present invention pertains to resource scheduling in distributed computing systems, and in particular to a method and apparatus for vectorized resource management and scheduling in distributed computing systems using tensors.

BACKGROUND

In distributed computing systems, a resource scheduler matches work requests (i.e. requests for work to be performed) to the resources of the distributed computing system required to complete that work. In other words, the resource scheduler assigns resources in the distributed computing system to one or more work requests. After scheduling, work requests may be 'placed' on (i.e. performed by) their assigned resources.

Distributing computing systems receive a very large number of work requests and manage and schedule a very large number of resources. Further, the number of work requests received by a distributed computing system and the number resources in a distributed computing system are increasing. Due to the large and increasing number of work requests and resources, resource management and scheduling often needs to be managed so that resource schedulers can meet resource scheduling demands. In order to manage this increasing number of work requests together with resource management, effective parallelization techniques are required as it is computationally challenging to match many resource requests to many consumable resources (e.g. CPU, memory) over many time intervals. Current methods and systems for resource management and scheduling, even including techniques using parallelization, are subject to improvements in efficiency. Therefore there is a need for a method and apparatus to overcome one or more problems in the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments is to provide a method and apparatus for vectorized resource management and scheduling in a distributed computing system which involves using tensors (multi-dimensional arrays with a uniform data type) to represent resource requests and to represent a hierarchy of resources as a tensor in a scheduling context.

In accordance with embodiments, there is provided a method for resource management and scheduling in a distributed computing system. The method includes representing availability of the resources or usage of the resources in the distributed computing system using one or more resource tensors and receiving one or more requests for resources, each request for resources specifying resources in the distributed computing system required to satisfy a work request. The method further includes representing the requests for resources as one or more request tensors and scheduling resources in the distributed computing system in accordance with the one or more resource tensors and the one or more request tensors.

In some embodiments, the method further includes representing a total amount of the resources in the distributed computing system using one or more capacity tensors and scheduling resources in the distributed computing system is further in accordance with the one or more capacity tensors.

In some embodiments, during scheduling, the method further includes updating the one or more resource tensors based on values in the one or more request tensors in response to a condition. The condition is one of placement of the work request on a subset of the one or more resources that are available, completion of the work request requiring the one or more resources or release of the one or more resources requested by the work request.

In some embodiments, the method further includes determining a subset of the one or more resource tensors that has sufficient capacity for the work request. In some embodiments, the method further includes determining a subset of the one or more resource tensors that is a best fit for the requested resources, wherein the best fit is determined based on calculating an extent of suitableness score for each subset of the one or more resource tensors when placing the work request on the requested resources. In some embodiments, the extent of suitableness score for each of the subset of the one or more resource tensors is determined based on the similarity (in a mathematical sense, e.g. cosine similarity) between total resource usage upon placement of the request thereon and total capacity of the resource.

In accordance with embodiments, there is provided an apparatus for resource management and scheduling in a distributed computing system. The apparatus includes a processor and a memory storing machine-executable instructions. The instructions when executed by the processor configure the apparatus to represent availability of the resources or usage of the resources in the distributed computing system using one or more resource tensors and receive one or more requests for resources, each request for resources specifying quantities of specific resources in the distributed computing system required to satisfy a work request. The instructions, when executed by the processor, further configure the apparatus to represent the requests for resources as one or more request tensors and schedule resources in the distributed computing system in accordance with the one or more resource tensors and the one or more request tensors.

In accordance with embodiments of the present invention, there is provided a network node for resource management and scheduling in a distributed computing system. The network node includes a network interface for receiving data from and transmitting data to components connected to the distributed computing network, a processor, and a non-transient memory for storing instructions. The instructions when executed by the processor configure the network node to represent availability of the resources or usage of the resources in the distributed computing system using one or more resource tensors and receive one or more requests for resources, each request for resources specifying quantities of specific resources in the distributed computing system required to satisfy a work request. The instructions, when executed by the processor further configure the network node to represent the requests for resources as one or more request tensors and schedule resources in the distributed computing system in accordance with the one or more resource tensors and the one or more request tensors.

Embodiments have been described above in conjunction with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

Some aspects and embodiments may provide a number of advantages including faster speed due to the massive parallelization, more predictable execution (e.g. lower tail latency), the ability to use the right level of precision (e.g. exploiting low-precision arithmetic, making computation more efficient), and lower power consumption (e.g., running at a high Input-Output Operations Per Second (IOPS) per watt). Furthermore, offloading at least some of the scheduling to a co-processor can leave host CPU resources available to complete the requested work. This may provide an improvement wherein there may be neither interference to the completion of work from scheduling nor interference to scheduling from the completion of work.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Definitions

Figure 1:
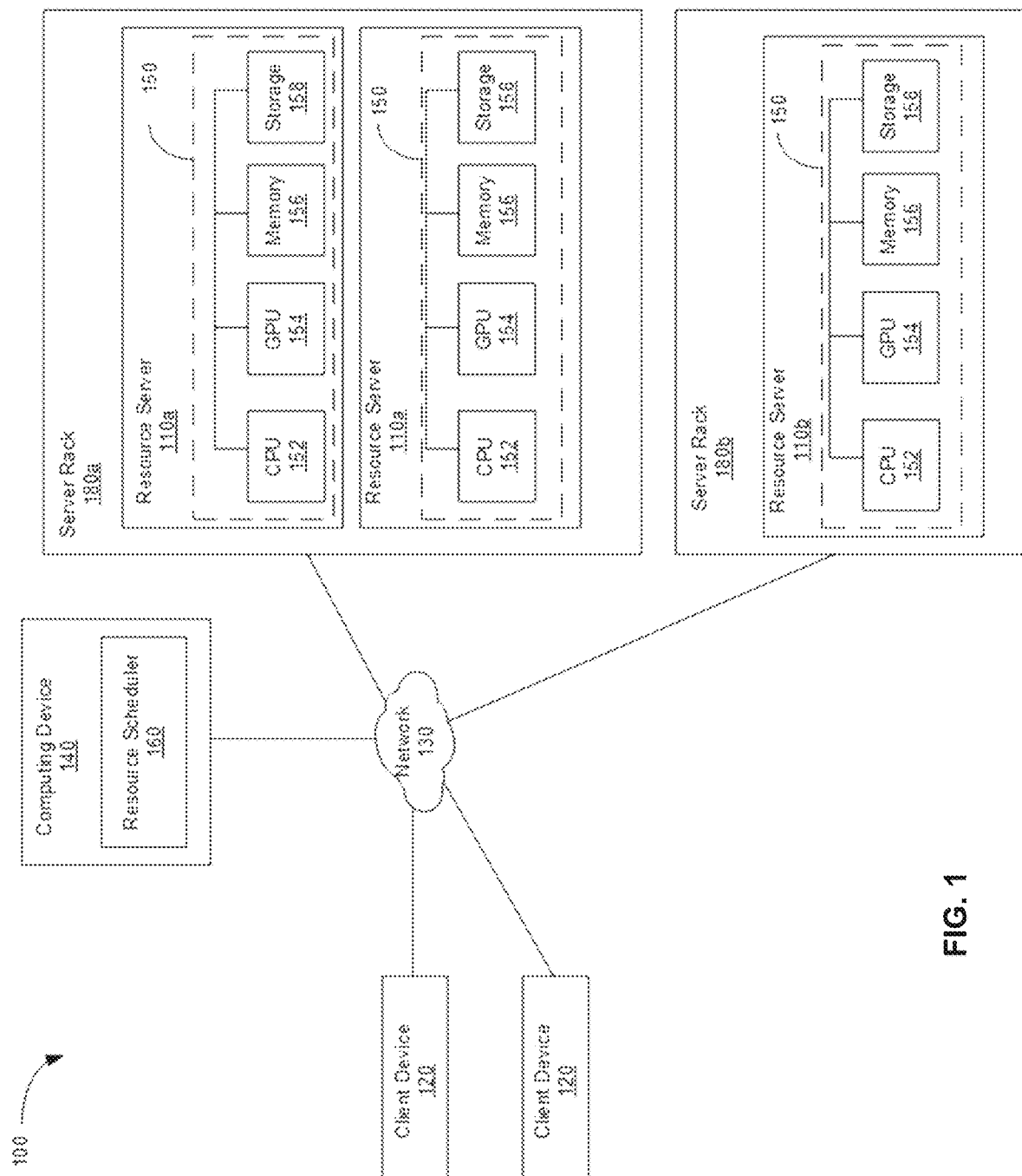
FIG. 1 illustrates a distributed computing system for vectorized resource scheduling using tensors, in accordance with embodiments.

As used herein, the term "about" should be read as including variation from the nominal value, for example, a +/−10% variation from the nominal value. It is to be understood that such a variation is always included in a given value provided herein, whether or not it is specifically referred to.

The term "Advanced Vector Extensions" (AVX) refers to a set of computer instructions for Intel® and AMD® microprocessors that support single-instruction multiple-data (SIMD) operations. For example, AVX may enable the execution of a certain operation on multiple tasks simultaneously for the same amount of time that it takes to process the same operation on one task (i.e., parallel processing).

The term "Assignment Problem" refers to one of the fundamental combinatorial optimization problems (i.e., problems with a solution from a combination of a finite set of elements), where a maximum weight matching is sought in a weighted bipartite graph, i.e., identifying the maximum weight matching of nodes from one group, to nodes in another group, where the nodes are in two groups (e.g., 'requests' and 'hosts'), and there is a requirement that each request goes to one host, and each host is connected to only one request. In scheduling, the weights can encode how well each request 'fits' on each host (e.g. by using cosine similarity). If there are a different number of elements in each group, it is an 'asymmetric' assignment problem. Generally speaking, scheduling can be an asymmetric assignment problem.

The term "Broadcasting" refers to how NumPy, PyTorch, TensorFlow and/or other software libraries treat tensors with different shapes during vectorized arithmetic operations, essentially aligning and copying tensor dimensions in order to enable the operations to proceed. The 'shape' of the tensor is described below and refers to the number of dimensions and number of elements (i.e., component values) in each dimension. For example, when there is an operation involving two tensors with different shapes, for each dimension, the 'broadcasting' technique means that NumPy acts like it 'copies' the smaller array dimension (and its values) out as many times as needed in order to match the larger dimension so that the arrays can have compatible shapes and the arithmetic operation can proceed. Compared to alternative methods (e.g. explicitly copying or looping in the software code), the use of the broadcasting technique can typically lead to very efficient implementations of algorithms.

The term "Cluster", in the context of distributed scheduling, refers to a group of computers arranged to execute distributed programs (e.g. programs running across multiple machines). A Cluster is, in a physical aspect, a number of machines linked together. Each machine has Central Processing Unit (CPU) cores, memory, etc. and may be viewed as a 'Host' or 'Server' that work should be running on. From the perspective of the resource scheduler, a Cluster is, in a logical aspect, a collection of resources (e.g. resources may be CPU cores, memory, storage, network, Graphics Processing Units (GPUs), port number, software licenses etc.) that the resource scheduler must match with the distributed programs requesting resources for completion of their work (e.g. OS processes, serial/parallel batch jobs, Virtual Machines (VMs), containers, serverless functions, etc.).

The term "data type" refers to an attribute of variables/ data in computer programs which constrains the types of values that the variable can take, the operations that can be performed on those variables, and how the variables are stored and manipulated on the computer system. Common examples include the Boolean data type, the Integer data type, and the Real-valued (floating-point) data type.

The term "distributed computing system" refers to a computing system whose components or resources are located on different networked computers.

The term "Graphics Processing Unit" (GPU) refers to a specialized electronic circuit originally designed to generate images rapidly for output to a display device. GPUs have been used to execute general parallelized algorithms, in particular matrix multiplication and related computations (e.g. General-Purpose computing on Graphics Processing Units (GPGPU)). GPUs process operations in parallel similar to how AVX/SIMD instructions are processed on CPUs, but GPUs provide more parallelization of the processing operations.

The term "Host" refers to a host machine (e.g. server) onto which the resource scheduler places work to run.

The term "Input-Output Operations Per Second" (IOPS) refers to a performance measurement used to benchmark storage devices.

The term "Maximum Weight Matching problem" refers to the problem of finding, in a weighted graph, a matching in which the sum of weights is maximized. A special case of a maximum weight matching problem is the assignment problem (described above), in which the input is restricted to be a bipartite graph.

The term "NumPy" refers to a scientific (software) library for the Python programming language. NumPy adds support for large multi-dimensional arrays and matrices (e.g. 'tensors'—but tensors are normally referred to as 'arrays' in NumPy) with a large collection of operations on those data structures.

The term "Operating System" (OS) refers to software running on a computer that schedules tasks, executes applications and controls disk drives, monitors and/or other peripheral devices.

The term "PyTorch" refers to a machine learning (scientific) library for the Python programming language. PyTorch provides a collection of special operations for neural networks. PyTorch can be described as 'NumPy on GPUs'.

The term "Resource Management" (RM), in the context of a distributed computing system, can be understood as scheduling where the resources span multiple machines and the work to be performed comprises batch jobs (batches of individual tasks to run in parallel). RM can be also considered as the part of scheduling which includes (1) resource definition and discovery, aggregation and presentation, and (2) resource life cycle monitoring. In this application, the resource manager keeps track of resources in the distributed computing system that are available for scheduling or usage of resource in the distributed computing system whereas the resource scheduler does the match-making part, wherein resource requests are matched with the appropriate resources.

The term "Resource Model" refers to the data structure, i.e., the data organization and storage format, by which resource information, for example parameters that are indicative of the particular resource (e.g. CPU characteristics, memory characteristics, assigned usage of a resource etc.), is recorded, updated, and communicated in a resource management system. A resource model is the computer-internal representation of the real-world physical resources, and can be used when requesting and scheduling computational resources.

The term "Scheduling", in computing, refers to a method of assigning resources to work (e.g. 'requests') over time for completion of the work. Scheduling may be also considered as 'placing' a request on a resource. Requests for work may be requests to run processes on an operating system, batch jobs specified by users, or virtual machines (VMs) to run on servers, etc. Resources may include CPU Cores, Memory, Storage, Network Ports, GPUs, etc. Every computer, including all smartphones and laptops, has an OS which comprises a resource scheduler determining which processes should run at any given time. Similarly, in a larger scale, for example in a distributed (multi-machine) computing system, resource schedulers may be needed to decide which work requests should be placed on which machines, etc. It is understood that in a distributed computing system, a plurality of work requests may be placed on a single host resource. For example, if a host server has 10 CPU cores, and the scheduler receives requests for placement of Virtual Machines (VMs) that each require 1 CPU core, the scheduler may be able to place up to 10 VMs on the one host (assuming there is sufficient memory and other resources on the host for all 10 VMs).

The term "Scheduling Operations" can be understood as match-making or work placement being performed in scheduling. Scheduling Operations may include (i) seeing which resources have enough capacity to satisfy a request (the subset with 'adequate' capacity to fulfil the work request), (ii) determining which resources are the 'best fit' for a request, and/or (iii) "placing" a request on resources (e.g. recording in its internal data structures that the resources are now being used and are thus not available for other requests).

The term "Tensor" can be regarded as a multi-dimensional array of values with a uniform data type (e.g. Boolean, Float, Integer, etc.). In programming languages, values of a tensor can be accessed through indexes. For example, a one-dimensional array (one-dimensional tensor) is a vector and its values can be accessed, for example, by array[0], array[1] or array[10]. A two-dimensional array (two-dimensional tensor) is a matrix, and its values can be accessed with two indices, for example, by array[0][1] or array[5][7]. Tensors are a generalization of scalars, arrays, and matrices to an arbitrary number of dimensions (e.g. indexed with an arbitrary number of indices). In the context of the present application, resources may have a hierarchical structure, and thus may be defined as a tensor. For instance, each datacenter has multiple racks, each rack has multiple hosts (i.e., machines), each host has multiple processing units and each processing unit has multiple cores.

The term "Shape" of a tensor (or "Shape" of an array) refers to a dimension of the tensor (multi-dimensional array), e.g. 40×10×3. The Shape of a tensor specifies the size of the tensor at each dimension. For example, if the tensor is of shape 40×10×3, the size of the tensor at each dimension is 40, 10 and 3, respectively. In this case, the tensor will contain 40*10*3=1200 values in total. The size of a tensor at each dimension equates to the length of the multi-dimensional array in that dimension. The length of the array equates to the maximum index value of the array plus one, in case zero indexing is used (i.e. the array index starts at 0). (e.g. When the tensor has a shape of 40×10×3, the size of arrays at each dimension is 40, 10, and 3. With this tensor, array[35][6][2] represents valid indices but array[50][50][50] does not represent valid indices as each index exceeds the size of the tensor at the corresponding dimension.)

The term "Single Instruction Multiple Data" (SIMD) refers to one kind of parallel computing operation such that a single 'instruction' (e.g. "increase value by one") is executed on a 'vector' of data points at the same time. A SIMD instruction requires corresponding hardware that can implement the SIMD operation.

The term "Tail Latency" refers to a high-percentile latency value, such as $98^{th}$ percentile or $99^{th}$ percentile latency. The response time for an operation would be different each time that operation is run on the computer system. When the frequency of each response time is graphed as a histogram, there will be a tail of this distribution of the response time. The tail of the response time distribution would represent the values in the distribution such that a larger percentage of all latencies are below these values, e.g. 98% of latency are less than these values.

The term "Tenant" refers to a user or group of users that are treated consistently by a cluster scheduler. A tenant typically corresponds to a business unit within an organization (e.g. Sales, Data-science, Marketing and Administration). Tenants may also be arranged in a hierarchical relationship. The notion of tenant has arisen as clusters have grown in size and businesses have tried to improve their utilization by sharing resources among multiple user groups. With regard to sharing resources, one of the simple policies enforced by a (cluster) scheduler for tenants is that each tenant is entitled to, or guaranteed, a certain amount of the cluster resources (e.g. a 'guaranteed share'). However, when one tenant is not using its resource, other tenants may borrow the unused resources, up to a certain amount of all cluster resources (e.g. 'maximum share').

The term "TensorFlow" refers to a machine learning library, developed by Google, primarily accessed through Python.

The term "Tensor Processing Unit" (TPU) refers to an Artificial Intelligence (AI) accelerator application-specific integrated circuit (ASIC) developed by Google specifically for neural network machine learning.

The term "Vector", in computer science, refers to an array of numbers. In this application, a 'vectorized' operation means an instruction that operates on multiple numerical values in parallel.

The term "Virtual Machine" refers to a computer program that emulates a computer system (e.g. a Windows or Linux computer with an entire file system, operating system, etc.) which itself runs as a process on a host machine.

Unless defined otherwise above, all other technical and scientific terms used herein have the same meaning as commonly understood by one of ordinary skill in the art to which this invention belongs.

Embodiments involve representing the hierarchy of resources in a scheduling context as a multi-dimensional array of a uniform data type in order to provide greater efficiency in resource scheduling. The multi-dimensional array of a uniform data type is referred to as a 'tensor'. In other words, embodiments involve the use of a 'tensor' resource model, and the associated vectorized tensor operations, such as broadcasting, enabled by such a model. Such a resource model may be used for each of resource usage, requested resource, resource capacities, tenant resource usage, etc. Embodiments use tensor scheduling operations (i.e., tensor scheduling algorithms) to make use of this new resource model and its associated operations. Some embodiments may exploit specialized hardware, such as GPUs and tensor-processing units, in order to accelerate the tensor scheduling operations.

As previously noted, according to embodiments, scheduling problems can be addressed and solved by representing resources using tensors (multi-dimensional arrays of a uniform data type). This common, generic, vectorized model may be used for requested resource, resource usage, resource capacities, tenant resource usage, etc. The resource model may also be used to efficiently represent scheduling operations (e.g. placing a request on a host). The resource representation and the set of scheduling operations may be referred to as "tensor scheduling". In some embodiments, a circular buffer may be used for the time dimension. Use of the circular buffer is described elsewhere herein for example with respect to FIG. 7 and may improve update efficiency. In some embodiments, specialized hardware may be exploited for tensor scheduling operations.

The fundamental approach described herein in relation to resource representation may have advantages including improved efficiency for resource scheduling and scheduling operation implementation. According to embodiments, the resource representation allows vectorized and parallelized arithmetic operations to be (automatically) used for core scheduling operations. Tensor broadcasting operations may be efficiently executed by using scientific (software) frameworks or libraries, such as NumPy and TensorFlow. The tensor arithmetic operations may be used to more efficiently implement scheduling operations. The scheduling operations may include (i) logically placing a request on a target resource, (ii) checking whether resource capacity or availability is sufficient to satisfy a scheduling request, (iii) calculating 'best fit' for a scheduling request (e.g. cosine similarity), (iv) determining the number of times a request can fit on one or more hosts, and (v) resolving conflicts. It should be noted that when logically placing a request on a target resource, the operation updates the internal resource model to reflect that target resource availability is reduced after placing the request thereon.

By representing resources using tensors, scheduling operations may be executed using specialized hardware, such as CPU for SIMD instructions, or special 'co-processors' such as GPUs, GPU Tensor Cores, and TPU, that is optimized for matrix operations. Thus, when resources are represented using tensors, scheduling operations are improved in a number of aspects. For example, some specialized hardware, such as GPUs, GPU Tensor Cores and TPUs, may process scheduling operations faster than regular processing units (e.g. regular CPUs) as they exploit massive parallelism and use an appropriate level of precision for the scheduling arithmetic. Some specialized hardware may use a lower level of precision for the scheduling arithmetic for efficiency as extremely precise numbers (e.g. numbers with 20 decimal places) are generally not needed to determine if there are enough resources (e.g. CPUs) on a server. Such specialized hardware may also use less power thereby, for example, achieving high IOPS per watt. Moreover, specialized hardware such as GPUs, GPU Tensor Cores or TPUs may carry out more predictable execution thereby achieving lower tail latency. If schedule operations are running on a dedicated co-processor, more predictable execution can be achieved because scheduling operations are not delayed by other processes running on the processing unit. Furthermore, as scheduling operations are offloaded by a host processing unit to specialized hardware or accelerator such as GPUs, GPU Tensor Cores or TPUs, the scheduling operations do not interfere with other host processing unit operations. In other words, the resources of the host processing unit would not be used for scheduling operations but left for processing unit operations. As such, there can be limited to no interference to processing unit operations from scheduling operations and limited to no interference to scheduling operations from processing unit operations.

FIG. 1 illustrates an example of the distributed computing system 100 for vectorized resource scheduling using multi-dimensional hierarchical arrays with a uniform data type, in accordance with embodiments. Referring to FIG. 1, each of the client devices 120 may be communicatively and operatively connected to the computing device 140 and the server racks 180a and 180b via the network 130. The computing device 140 and the server racks 180a and 180b may also be communicatively and operatively connected to each other via the network 130.

According to embodiments, the client devices 120 may be any device used directly by an end-user to communicate such as a mobile phone, smart phone, a computer equipped with network function, or other device that may be classified as a User Equipment (UE). The client devices 120 may be a Machine Type Communications (MTC) device (also referred to as a machine-to-machine (m2m) device), or another such device that may be categorized as a UE despite not providing a direct service to a user.

According to embodiments, the computing device 140 may be placed in the same datacenter that the server racks 180a and 180b are placed, or it may be placed in another datacenter. While not shown in FIG. 1, there may be one or more other computing devices in the distributed computing system 100. These computing devices may be placed in the same datacenter that the computing device 140 is placed or they may be placed in other datacenters. The computing device 140 may comprise one or more resource schedulers 160. While not shown in FIG. 1, there may be one or more other resource schedulers in the computing device 140. The resource scheduler 160 may perform one or more scheduling operations as illustrated above (e.g. placing requests on a host, determining whether a request fits on a host, finding the best host on which to place requests, resolving conflicts, etc.).

According to embodiments, there may be one or more datacenters in the distributed computing system 100. Each of the datacenters may comprise one or more server racks (e.g. server racks 180a or 180b). The server racks may be similar to the server racks 180a and 180b shown in FIG. 1 in one or more aspects (e.g. components, functionality). In some embodiments, the server racks 180a and 180b may be placed in the same datacenter. In some embodiments, the server racks 180a or 180b may be placed in two different datacenters. Referring to FIG. 1, the server rack 108a comprises multiple resource servers 110a and the server rack 180b comprises a single resource server 110b. While FIG. 1 illustrates that there are only two resource servers 110a in the server rack 180a, it will be readily understood that there may be more than two resource servers 110a placed in the server rack 180a.

According to embodiments, each of the resource servers 110a and 110b may comprise resources (e.g. resource 150). Each resource may comprise one or more further resources in turn, and these may in turn comprise further resources, until the level of consumable resources (e.g. CPU, GPU, Memory, etc.) is reached. For instance, referring to FIG. 1, the server resource 150 may comprise one or more of processing units (e.g. CPU 152, GPU 154, TPU, etc.), memory (e.g. Memory 156), storage (e.g. Storage 158) and other consumable resources that requests may require. In some embodiments, each of these consumable resources may be composite resources, which in turn are composed of further consumable or composite resources.

Figure 2:
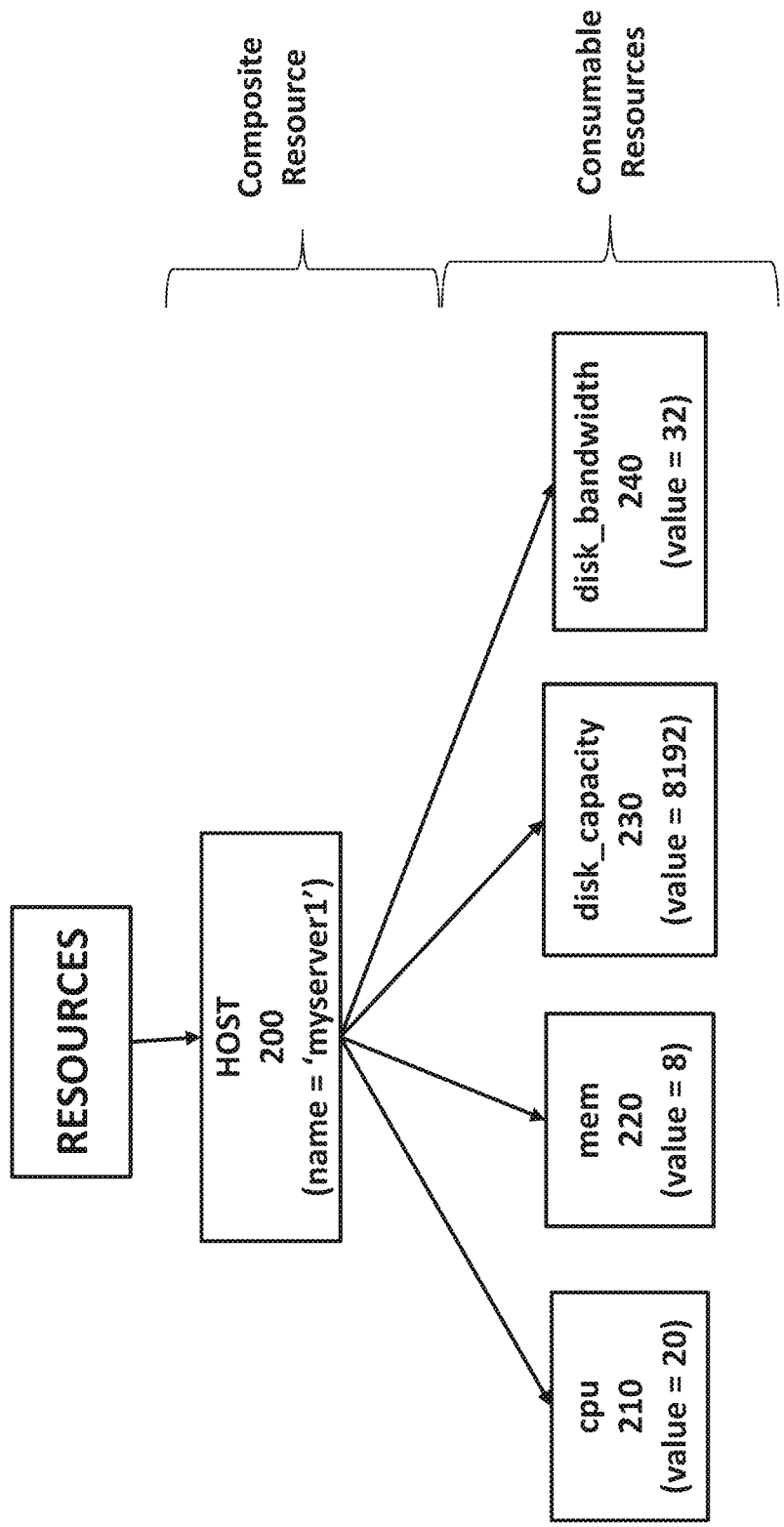
FIG. 2 illustrates a hierarchical structure of resources in a distributed computing system.

As stated above, resource scheduling refers to matching work requests to resources needed for completion of the work. Once matched, the requests may be regarded as being 'placed' on their assigned resources. The resource scheduling can be complicated due to the hierarchical relationships between various resources. FIG. 2 illustrates the hierarchical structure of resources in a distributed computing system. Referring to FIG. 2, a single host resource 200 named 'myserver1' includes 'cpu' 210, 'mem' 220, 'disk_capacity' 230 and 'disk_bandwidth' 240 as its resources; as such, the relationship between the host 200 'myserver1' and other resources (e.g. 'cpu' 210, 'mem' 220, 'disk_capacity' 230 and 'disk_bandwidth' 240) are hierarchical. The host 200 'myserver1' may be regarded as a 'composite' resource (i.e., it is composed of other resources). On the other hand, the 'leaf-level' resources, such as 'cpu' 210, 'mem' 220, 'disk_capacity' 230 and 'disk_bandwidth' 240 illustrated in FIG. 2, may be regarded as 'consumable' resources. The concept of the resource hierarchy can be extended. While not shown in FIG. 2, the host 200 named 'myserver1' may be just one host in a rack of hosts; the host rack may be one of many host racks in a datacenter. Further, there may be a plurality of datacenters in the distributed computing system. Each of these higher levels may be regarded as a composite resource in a resource hierarchy.

With resources having a hierarchical structure, scheduling includes matching a work request to one target resource at a target level in a resource hierarchy. Specifically, at the target level, scheduling may include matching a work request (e.g. VM) to one host (the target resource), where the single host is implied to be on one host rack at one datacenter (e.g. a work request will be matched to one 'or' the other of the hosts). Simultaneously, at the levels below the target level, a work request typically requires a specified portion of all consumable resources below the target resource (e.g. numeric resources at the leaf level of the hierarchy rooted at the target resource, i.e., below the host). As such, scheduling at the levels below the target level may include matching consumable values in a work request to all consumable resources in the resource hierarchy rooted at the target resource. For example, a VM may need the 'cpu' 210 and 'mem' 220 and 'disk_capacity' 230 and 'disk_bandwidth' 240 of the host 200 'myserver1'.

As an example, consider a work request for placement of a VM, where the resource requirement of the work request is 1 CPU core and 2 GB of memory. Suppose the target is to find a host for placement of this work request. Suppose there is a data center, which has a host rack, which has a host, which has 10 CPU cores and 35 GB of memory available. Scheduling involves the determination that this particular host has sufficient consumable resources such that the work request can be placed on the host. If the resource scheduler does place the work request on the host, the resource scheduler needs to update its resource information to reflect that now there would be only 9 CPU cores and 34 GB of memory remaining on the host, after placement of this work request.

Resource scheduling has become more complicated and computationally intensive due to recent trends in distributed computing systems. Essentially, resource scheduling is happening at a large scale. One trend is that there are a very large number of target resources now. For example, there can be 20,000 to 100,000 host machines and more than 10,000 requests may need to be handled per second. As such, considering each of these host machines has a number of consumable resources that need to be tracked, such as cpu and memory, resource scheduling is now very complicated and computationally heavy.

The other trend in computing with respect to resource scheduling is a necessity or desire to manage resource scheduling over time. In the past, tasks or work requests were ready to commence right away and were scheduled on any free hosts. However, today's resource scheduling often requires more than this as there are now demands for reserving available resources in advance, as further discussed below.

Figure 3:
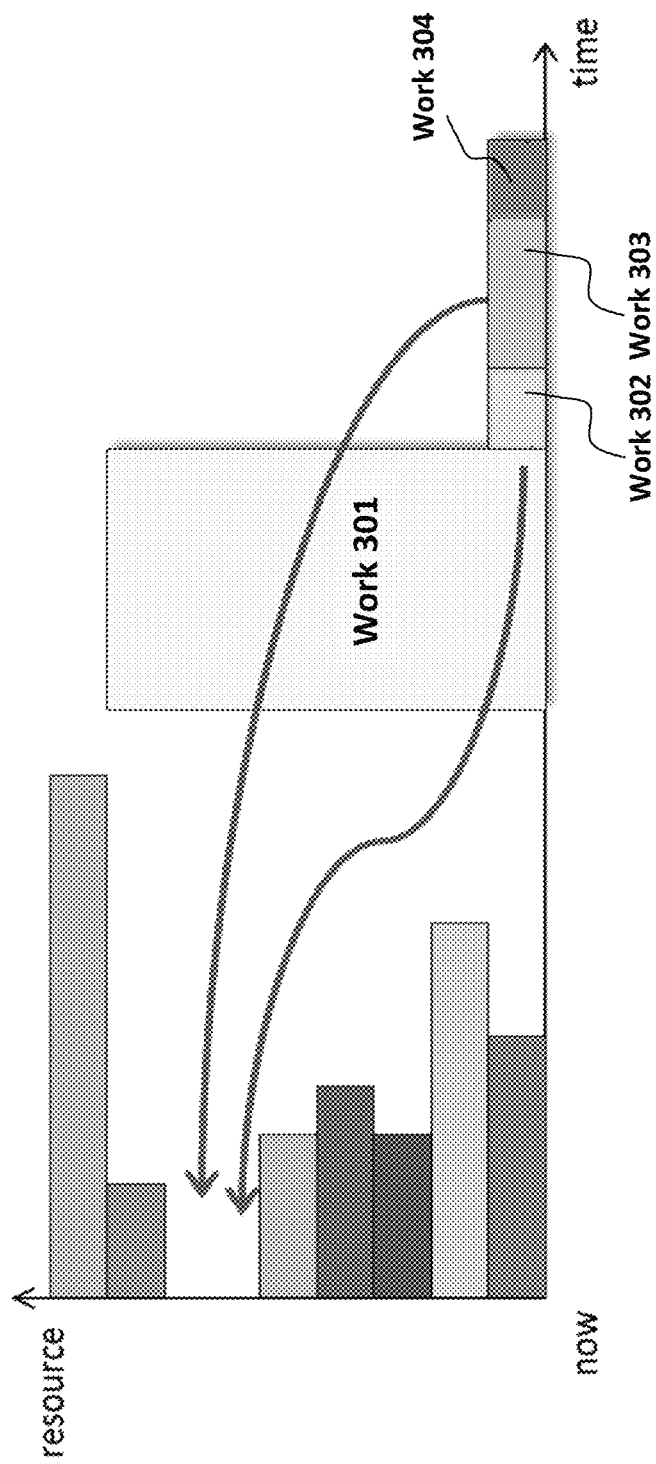
FIG. 3 illustrates resource scheduling for work planned to run in the future.

Referring to FIG. 3, the "resource" illustrated may refer to CPU cores on one host and the Work 301 is planned to be performed sometime in the future (using one or more CPU cores). In this circumstance, the resource scheduler may need to determine whether Work 302, Work 303 or Work 304 can be placed on currently-available resources so that one or more of Work 302, Work 303 or Work 304 can be started now, while still ensuring that Work 301 will have adequate resources to run at its appointed time in the future. This technique is called 'backfilling'. However, backfilling may not be always used as Work 301 cannot be started as planned if the time required to complete Work 302, Work 303 or Work 304 is too long.

In another case, if there is a scheduled maintenance for the host machine at some point in the future, and therefore all CPU cores on the host machine will not be available during this scheduled maintenance (e.g. no work can be performed on the host machine during this scheduled maintenance time), the resource scheduler may also need to determine whether there is sufficient time for one or more work requests to start and run to completion on the host machine prior to the beginning of the scheduled maintenance period.

In order to make more effective decisions with regard to resource scheduling in the above situations, it is desirable to determine the time required for completing the requested work. If the time required for the work completion is not known, the resource scheduler may be able to predict the work's resource usage over time and the duration that the work is using the resources.

Moreover, as there are some work requests with fixed timeouts (e.g. time-limits or maximum durations that the work can be performed), the resource scheduler may not need to predict the work's exact duration, but use the time limit as the predicted duration. For example, many serverless functions have time-limits, and many cloud service providers support serverless functions (e.g. AWS® Lambda).

As illustrated above, the time dimension may be a highly complicated concept in the context of resource scheduling in the distributed computing system. However, consideration of the time dimension may be needed for effective resource scheduling. For this, embodiments propose using the time dimension as another resource dimension in a resource hierarchy.

Resource schedulers often do not have generic ways to represent models. While some resource schedulers may contain data structures in their source code, the data structures are only available for some specific resources of interest (e.g. 'cpu' and 'memory'). In many prior resource representation models (e.g. YARN, OpenStack), resources are hard-coded, independent objects, are demonstrated only in scalar values, and have no time-dimension. Also, these are not resource models that can encode user-defined resources.

There are a few generic resource models. One example is the flat resource model proposed by Chan and Curry in U.S. Pat. No. 6,829,765. The flat resource model represents resources generically in a resource management (RM) system. However, hierarchical resource structure cannot be represented in this approach. Another example of a generic resource model is the generic resource model for distributed resource management proposed by Guo, Chen, and Lam in U.S. Patent Application Publication No. 2017/0153918A1. This model can represent hierarchical structure of resources. In this generic resource model, the resource values at the bottom level are scalar values of different data types. This resource model can have multiple data types (e.g. a mix of Boolean, String and Floating values), thus it is a flexible model. However, this generic resource model can become inefficient when the number of resources to be scheduled increases.

In the context of hierarchical resources, a primary function of a resource scheduler is matching work requests to a target resource at a target dimension in a resource hierarchy. This function may include three sub-problems—(i) determining which target resources have enough consumable resources to satisfy a request, (ii) determining which target resources are the 'best fit' for the request based on appropriate criteria (e.g. spreading requests across the hosts, etc.), and (iii) resolving conflicts as they arise, especially when scheduling decisions are made in parallel. Resolving these three sub-problems can be considered 'scheduling operations'. One example of a scheduling operation in a distributed computing system, in particular, is checking whether a host has sufficient resources for a work request, is illustrated in FIG. 4.

Figure 4:
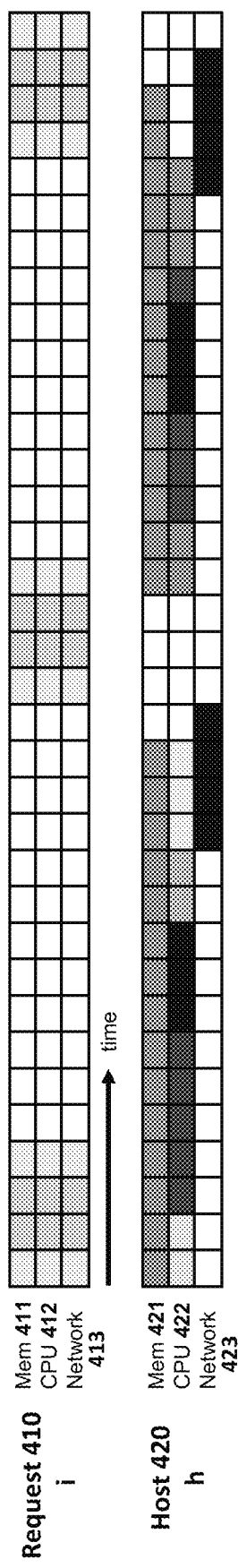
FIG. 4 illustrates an example of a scheduling operation in a distributed computing system, in particular checking whether a host has sufficient resources for a work request.

Referring to FIG. 4, each square of the upper grid represents the consumable resources (e.g. memory 411, CPU 412 and network 413) required by the work request 410 'i' over time and each square of the lower grid represents the current usage of the consumable resources (e.g. memory 421, CPU 422 and network 423) at the host 420 'h' over time. Specifically, the darkness of the colour at each square of the upper grid demonstrates the amount of consumable resources (e.g. memory 411, CPU 412 and network 413) required by the work request 410 'i' at a specific time and the darkness of the colour at each square of the lower grid demonstrates the amount of current usage of consumable resources (e.g. memory 421, CPU 422 and network 423) at the host 420 'h' at a specific time. The darker the color of a square in the upper grid means the work request requires more consumable resources at the specific time. Similarly, the darker the color of a square in the lower grid means usage of each consumable resource at the host is heavier at the specific time. On the other hand, a white square means the consumable resource is not used or not required and a black square means the consumable resource is fully used or fully required.

Referring to FIG. 4, the horizontal axis represents time or timesteps. For each host/request check (e.g. work request 410/host 420), the resource scheduler may check whether usage of each consumable resource (e.g. memory 421, CPU 422, network 423, indexed by r=1 R) is within its capacity at each timestep (e.g. t=1 . . . T). In other words, the task of the resource scheduler is to check if the sum of the consumable resources required by the request (i.e., each square of the upper grid) and the consumable resources used by the host (i.e., each square of the lower grid) is less than the capacity of the consumable resource at each timestep, for all timesteps. The capacity of each consumable resource may equate to the usage of the consumable resource when the usage is 100% (e.g. the square is black). When there are 'I' requests and 'H' host resources, each with 'R' consumable resources, the resource scheduler may determine if each request (i.e., request i=1 . . . I) fits in each host resource (i.e., host resource h=1 H) such that the usage of each consumable resource (i.e., resource r=1 R) is within its capacity after adding the requested values, for each timestep (i.e., timestep t=1 . . . T). For the entire checking process, the resource scheduler needs to perform I*H*R*T checks in total.

In this regard, scheduling relative to resources and time is computationally very expensive (e.g. the number of checks is high). If there are 5000 hosts (i.e. H=5000) and 6 consumable resources (i.e. R=6) (e.g. CPU, memory, network, etc.) to check for scheduling and the check needs to be done for 7200 timesteps (i.e. T=7200) (note: if one timestep equates to one minute, then 7200 timesteps would be equivalent to 5 days), there would be 216 million values to check for each single request (i.e. 1=1). If there are 500 work requests (i.e. 1=500) to be scheduled, the resource scheduler needs to check 108 billion values.

In order to manage this computationally expensive (e.g. large scale) resource scheduling problem, resource scheduling operations may need to be parallelized. With the scalar-based resource models described above, scheduling may only be efficiently parallelized across requests (e.g. parallelization at the level of requests). Requests may be load-balanced across multiple resource schedulers, with or without multiple resource pools (e.g. silos) as illustrated below.

One way of parallelization across requests is to divide the resource into separate resource pools (e.g. silos) and have a designated resource scheduler for each of the resource pools to match (work) requests to resources in only that resource pool. This parallelization method may result in fragmentation. In other words, even if the total amount of available resources is sufficient to satisfy a work request, these available resource cannot be used for the work request as the resources are 'fragmented' across different resource pools.

Another way of parallelization across requests is to have one common resource pool with multiple resource schedulers handling a subset of the work requests. It would be understood that this parallelization method does not result in fragmentation across resource pools. However, with this method, as each resource scheduler makes decisions independently, there is always the possibility of making decisions that are in conflict with each other. Thus, the system needs to have a mechanism to resolve conflicts between different resource schedulers whenever they arise. The conflict resolving mechanism may add additional overhead to the system, and thus may make scheduling even more complicated.

As scheduling parallelization across requests has deficiencies, a better approach of parallelizing resource scheduling is desired. One method to overcome the problems identified above is to parallelize scheduling 'within' a request (i.e., performing parallel operations to schedule a single request). It would be understood that parallelization within a request can be performed simultaneously with either or both of the methods for parallelization across requests mentioned above. However, parallelization within a request may be more computationally efficient than parallelization across requests. Parallelization within a request may also be less complicated. However, parallelization within a request may require a new resource model. As such, there is provided a new resource model that can be used for parallelization within the request.

Embodiments can potentially improve several versions of scheduling. Embodiments may improve online one-by-one request scheduling where the scheduling is performed with or without a time dimension (e.g. schedule one request for 2 cores and 2 GB RAM for 10 minutes or other fixed period of time). For example, by using the new resource model, the scheduling computation can be parallelized within a request (as described above), over hosts and/or resources. This version may be regarded as a half-vectorized version since the scheduling computation is parallelized only over hosts and not over requests.

Embodiments may also improve online mini-batch scheduling where a number of requests are batched and then processed all in parallel (parallelization both within and across requests, as described above). The scheduling may be performed with or without a time dimension. The mini-batch scheduling case may be regarded as a fully-vectorized version because scheduling computation is parallelized over both requests and hosts, in contrast to the half-vectorized version where scheduling computation is parallelized only over hosts.

Embodiments may also improve offline look-ahead scheduling (planning). In this case, a full set of requests are known in advance. In this version, scheduling over the time dimension may be an important aspect of the scheduling problem. The offline look-ahead scheduling may be also be performed in a fully-vectorized version (or it may be only half-vectorized).

It should be noted that the line between online scheduling and offline planning can be blurred as the time dimension may be considered in the online cases (for instance, a subset of the work requests do not start until later—e.g. reservations).

According to embodiments, a new resource representation is used for scheduling, wherein resources are represented using tensors (e.g. multi-dimensional arrays of a uniform data type). In particular, the resource hierarchy may be represented as a tensor with a dimension for each resource level.

Figure 5A:
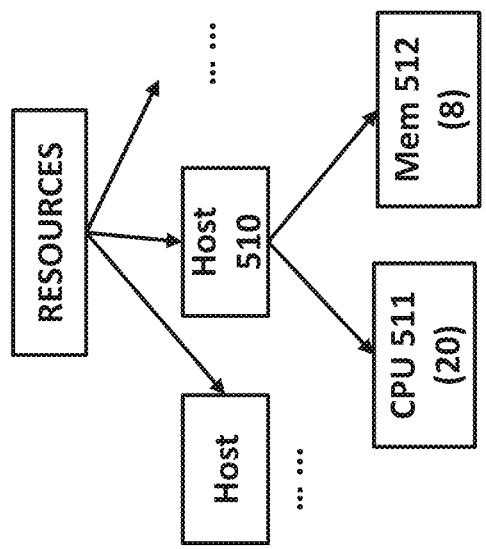
FIG. 5A illustrates a tensor-based resource representation encoding a resource hierarchy by converting a conceptual resource hierarchy into a tensor representation, in accordance with embodiments.
Figure 5A:
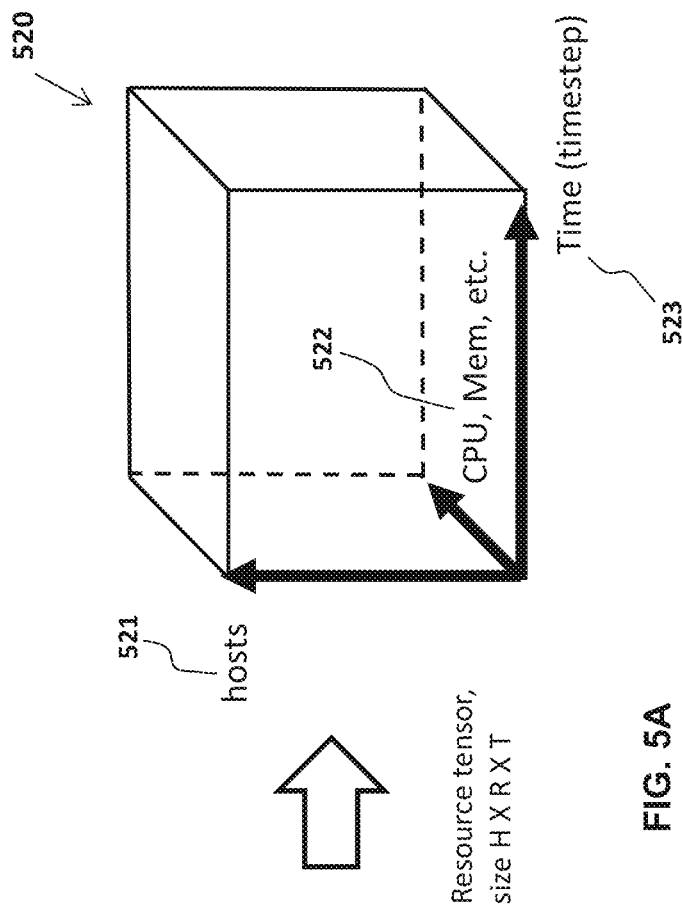
Figure 5B:
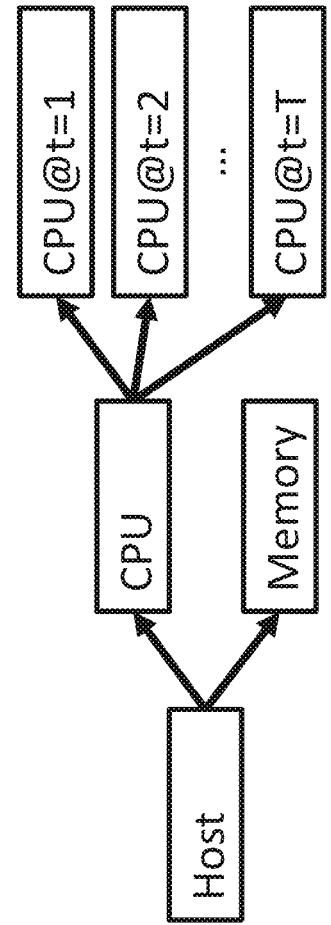
FIG. 5B illustrates a concept of viewing the time dimension as a consumable resource in a resource hierarchy in accordance with embodiments.

FIG. 5A illustrates a tensor-based resource model encoding a resource hierarchy by converting a conceptual resource hierarchy into a tensor representation, in accordance with embodiments. According to embodiments, the hierarchical relationship between different resource types may be encoded as the different dimensions in the tensor. Each 'level' in the resource hierarchy corresponds to a 'dimension' in the resource tensor. Resources in higher dimensions may be regarded as 'having' resources in lower dimensions. For example, the tensor (e.g. Tensor 520) may have dimensions representing hosts, consumable resources and timesteps. As such, the order of dimensions in the one or more resource tensors represents the hierarchical relationship of the resources, such that resources in one dimension contain resources in a subsequent dimension the resources. In this manner the resource tensor is able to represent the hierarchical relationship of the resources, such that resources at a second level of the hierarchical relationship contain resources at a first level of the hierarchical relationship. The 'host' dimension 521 has a size of 'H' thus there are 'H' hosts (e.g. HOST 510) in the distributed computing system. The host dimension 521 is followed by the 'consumable resource' dimension. The consumable resource dimension 522 has a size of 'R' thus there are 'R' consumable resources in total and each host 'has' all of these 'R' consumable resources. The arrays at the consumable resource dimension contain values for consumable resources such as 'cpu' (e.g. cpu 511), 'memory' (e.g. mem 512), 'disk_capacity', 'disk_bandwidth', etc. The consumable resource dimension 522 is followed by the 'timestep' dimension 523. The 'timestep' dimension 523 has a size of 'T' thus there are 'T' timesteps and each consumable resource 'has' values over T timesteps. Regarding timesteps, embodiments may regard the time dimension as another consumable resource in a resource hierarchy, for example as illustrated in FIG. 5B. It should be noted that the tree-style resource model in FIG. 5B is used for illustrating the concept of viewing time as consumable resource or sub-resource of other consumable resources.

According to embodiments, each array at the lowest dimension (i.e., bottom level) contains the actual values encoding the "consumable" resource amounts. For instance, resource tensor [h][r][t] will contain the value representing the amount of resource 'r' at host 'h' at time 't'. Referring back to the resource structure shown in FIG. 5A, if resource tensor[0][1][2]=20, then the resource model indicates that there are twenty 'cpu's (e.g. resource [0]=cpu) on the HOST 510 (note: HOST 510=host[1]) at timestep 2. The data type of the resource values in each tensor may be specified (e.g. Boolean, Integer, Float16, Float32, etc.).

According to embodiments, there may be a "resource tensor" (e.g. tensor 520 in FIG. 5A) encoding the resources across all hosts, all consumable resources and all timesteps (e.g. shape of H×R×T). The resource tensor may indicate the amount of each resource used (a "resource-usage tensor"), or alternatively the amount of each resource remaining (a "resource-remaining tensor"). In this application, the term 'resource tensor' may be used to interchangeably define "resource-usage tensor" and "resource-remaining tensor", unless there is a need to clearly distinguish whether a 'resource tensor' is a resource-usage tensor or a resource-remaining tensor.

The resource-usage tensor (the resource tensor indicating the amount of each resource used) may be used in conjunction with a tensor indicating the capacity (e.g. total amount) of each resource. The total-capacity tensor may indicate the maximum value for resource usage without exceeding the resource capacity. For efficiency, the total-capacity tensor may exclude any dimensions where the values are not variable. As such, the total-capacity tensor, for example, may have a shape of 1×R×1, if the total-capacity neither changes across different hosts, nor changes over time. If the total-capacity value varies by host and consumable resources but does not vary over time, the total-capacity tensor may have a shape of H×R×1. If the total-capacity value changes over all of the hosts, all of the consumable resources and all of the timesteps, then the total-capacity tensor may have a shape of H×R×T. It should be noted that, by the rules of broadcasting, whenever the size of the leading tensor dimension is one, that dimension (level) may be excluded from the resource representation without changing the output of the scheduling operations.

According to embodiments, the resource-usage tensor may be updated whenever a new work request is placed (e.g. scheduled) onto a resource, or whenever a previously requested work finishes using its assigned resource. The resource-usage tensor may also be updated over time (e.g. as time steps forwards). In some embodiments, the resource usage at new future timestep(s) may be forecasted using the resource usage values at past timesteps.

In some embodiments, instead of a resource-usage tensor and a total-capacity tensor, a single resource-remaining tensor (i.e., 'remaining capacity' or 'available capacity' tensor) may be used. The resource-remaining tensor may indicate the amount of resources remaining.

In some embodiments, one or more different types of tensors may be used in relation to resource management. The one or more different types of tensors may be used instead of or together with one or more of the resource-usage tensor, the total-capacity tensor and the resource-remaining tensor.

According to embodiments, there may be a request tensor for resource scheduling. The request tensor may encode the requested resources needed by a work request to be scheduled. When a single request is processed at a time, the request tensor may specify resources over the consumable resource and time dimensions. In such a case, the shape of the request tensor may be 1×R×T (or equivalently, R×T), and the size of the leading host dimension is one. When 'I' requests are processed in parallel at one time, the request tensor may be a tensor with the shape of I×1×R×T, as an extra dimension for 'I' requests is added. The host dimension is still equal to one for efficient use of broadcasting when scheduling operations are processed later. If the resource request is constant in the consumable resources over time, the request may be specified as an R×1 tensor, and the values in the tensor will be broadcasted as needed during the process of scheduling operations.

According to embodiments, there may be a scheduler which may also be referred to as a resource scheduler, for resource scheduling. The scheduler may be comprised of a computer-implemented set of instructions or methods for matching each request to one of the hosts in the resource tensor. As in the case described above, the target dimension may be the host dimension and the requests may specify resources needed at dimensions below this target level.

Figure 6A:
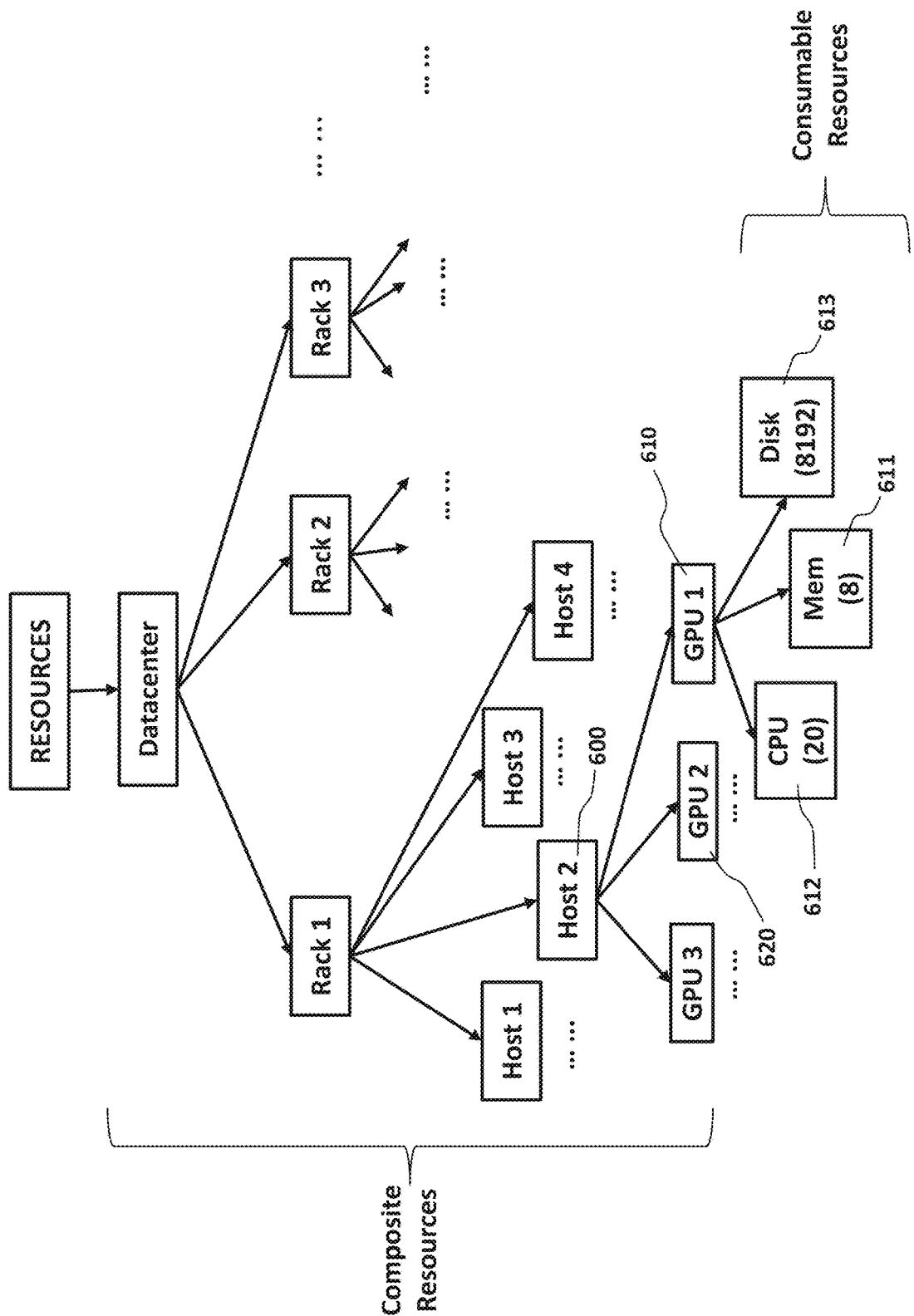
FIG. 6A illustrates an example of a resource hierarchy representation in a prior resource model.

FIG. 6A illustrates another example of a resource hierarchy representation, with a different target dimension. In this resource model, it is assumed that the objective is to match a request to one of the graphical processing units (e.g. GPU 610 GPU 620, etc.) at one of the hosts (e.g. Host 1, Host 2 600) at one of the racks (Rack 1, Rack 2, etc.) at one of the Datacenters. The target level is the processing unit (e.g. GPU 610, GPU 620). As such, each request may specify all resources (or consumable resources) that it requires below the processing unit level (GPU level). Here, the GPU may amount to a certain number of 'memories' and 'cores' for a particular period of time (e.g. T timesteps). When scheduling a single request, the shape of the request tensor may be R×T. In this case, the value of R would be three (3) as there are three types of consumable resources—'GPU memory' 611, 'GPU core' 612, and 'GPU disk' 613.

According to embodiments, the shape of the resource tensor may be D×K×H×G×R×T (D datacenters×H hosts×G GPUs×R consumable resources×T timesteps). The resources may be encoded as resource [d][k][h][g][r][t] and the requests may be encoded as request [r][t]. In various embodiments, using resource tensors and request tensors, a scheduling process can be implemented simply, even with a single line of computer source code, determining the datacenter, rack, host or processing unit (e.g. GPU 610, GPU 620) that is suitable for each request.

Figure 6B:
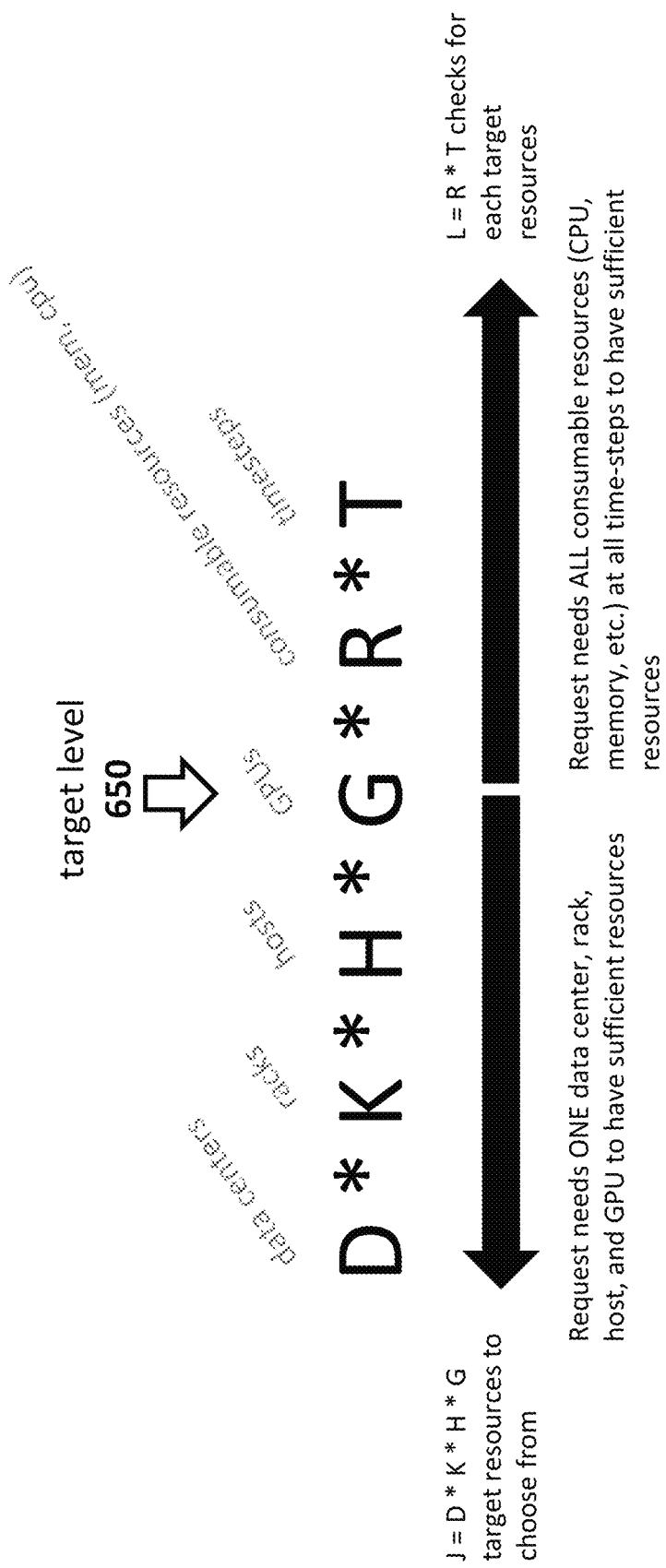
FIG. 6B illustrates a tensor target dimension in a resource tensor, in accordance with embodiments.

FIG. 6B illustrates a tensor target dimension (e.g. target dimension 650) in a resource tensor, in accordance with embodiments of the present invention. According to embodiments, one dimension in the resource tensor may be explicitly or implicitly used as a target dimension. Denoting one dimension as the target dimension indicates how resources at all dimensions should be used. In various embodiments, a request may be considered to require 'one' of the resources at the target level, and implicitly one of each of the levels above the target level. For example, referring to FIG. 6B, a request may need 'one' datacenter, 'one' rack, 'one' host and 'one' GPU to meet the resource requirement for completion of the request. Furthermore, in various embodiments, a request may be considered to require 'all' resources at all levels below the target dimension level. For example, referring to FIG. 6B, a request may need 'all' consumable resources (e.g. all CPU, all memory, etc.) at all timesteps in the tensor.

In some embodiments, the resource tensor may be reshaped into a J×L matrix for some scheduling operations (note: 'matrix' is a 2-dimensional tensor). All dimensions at the target level and above in the resource tensor are merged into a single dimension. This single dimension is the "J" dimension, i.e., the first dimension in the J×L matrix. Similarly, all dimensions at the target level and below in the resource tensor are also merged into another single dimension. This single dimension is the "L" dimension, i.e., the second dimension in the J×L matrix. As such, in case of the resource tensor model illustrated in FIG. 6B, the J dimension may be D*K*H*G in size and the L dimension may be R*T in size. In some embodiments, the request tensor may be reshaped into a single dimensional array with a size of L.

A resource tensor has some constraints compared to the resource model hierarchies used in prior work. Like prior models, a single resource tensor can encode a hierarchy or "tree" of resources. However, as a data structure based on multi-dimensional arrays, there is less flexibility about what resources can be encoded at different levels in the hierarchy. Specifically, in a single resource tensor, all numeric, consumable resources must be at the leaf level (e.g., actual CPU, Memory, Disk values etc.). Furthermore, as mentioned above, all numeric, consumable resources must have the same data type, e.g. have a uniform data type. Furthermore, all non-leaf resources are 'composite' resources (e.g. resources that contain other resources). Finally, all resources at a given level in the tree (e.g. resources at a given dimension in the tensor), must have the same number of children. While more constrained than prior models, the advantage of resource tensors is that operations on these models can be executed much more rapidly, via parallel, vectorized operations, as further described above. Moreover, to provide greater flexibility when these constraints are too limiting, those skilled in the art will understand how to adapt resource tensors in order to provide greater flexibility. Some examples of these adaptations will be further discussed below.

In some embodiments, there may be multiple resource tensors (and multiple corresponding request tensors and capacity tensors) to manage several different situations. In some embodiments, there may be multiple resource tensors when consumable resource values may logically exist at different levels of the resource hierarchy (e.g. violating one of the constraints of a single resource tensor, as described above). For example, there may be a separate resource tensor for resources shared across hosts, in addition to the resource tensor encoding the resources specifically available at each host. One example of a shared resource is a software license. A software license is a resource and only a certain number of requests can use this software license at one time. The software license can be used by requests across all hosts. In other words, the software license is shared among the requests across all hosts and the software license may be viewed as a shared resource. Since this shared resource, unlike other resources, does not belong to a particular host, separate resource tensors may be needed. As such, there may be separate resource tensors for shared resources to manage resource scheduling. Separate, corresponding request tensors and capacity tensors may also be needed.

In some embodiments, there may be a single tensor encoding the resource consumption across all tenants, as resource consumption over time by each tenant may need to be tracked to implement tenant sharing policies.

In some embodiments, there may be separate resource tensors for past resource usage (e.g. observed usage) and future resource usage (e.g. predicted usage). The tensor for past resource usage may be used to predict future resource usage and the tensor for future resource usage may be used to make a decision for resource placement that ensures sufficient capacity for future requested workload.

If some resources in the resource hierarchy logically have a different number of children (e.g., one host has one GPU, another host has two GPUs), this would also seem to violate one of the constraints of a single resource tensor, as described above. However, in some embodiments, a single resource tensor may still be used, provided 'zero (0)' capacity for missing consumable resources (e.g. non-existing GPUs) in the capacity tensor is encoded. For example, when some hosts have 'two' GPUs and some hosts have 'one' GPU, a single resource tensor may be used that logically encodes each host as having two GPUs. Then, 'zero (0)' capacity may be encoded for non-existing GPUs (e.g. a non-existing GPU on the hosts that actually have only one GPU) in the capacity tensor. However, in some embodiments, instead of encoding 'zero (0)' capacity, separate resource tensors may be used for each of hosts with one GPU and hosts with two GPUs.

Another violation of the single-tensor constraints may arise if all the consumable resources in the hierarchy are logically not the same data type (e.g. some bottom-level resource values are numbers, other bottom-level resource values are Boolean (True/False) values, etc.). In such a case, in some embodiments, separate tensors may be used for each resource data type.

Another violation of the single-tensor constraints may arise if not all the resources logically have a time dimension (e.g. if some resources are 'static' or simple 'label-based' resources). In one embodiment, a time dimension may be used for all resources, but the static resources may simply be constant over time. In another embodiment, separate resource tensors may be used, e.g., one with and one without a time dimension. In such an embodiment, requests can be checked separately for time-based and label-based tensors.

Figure 7:
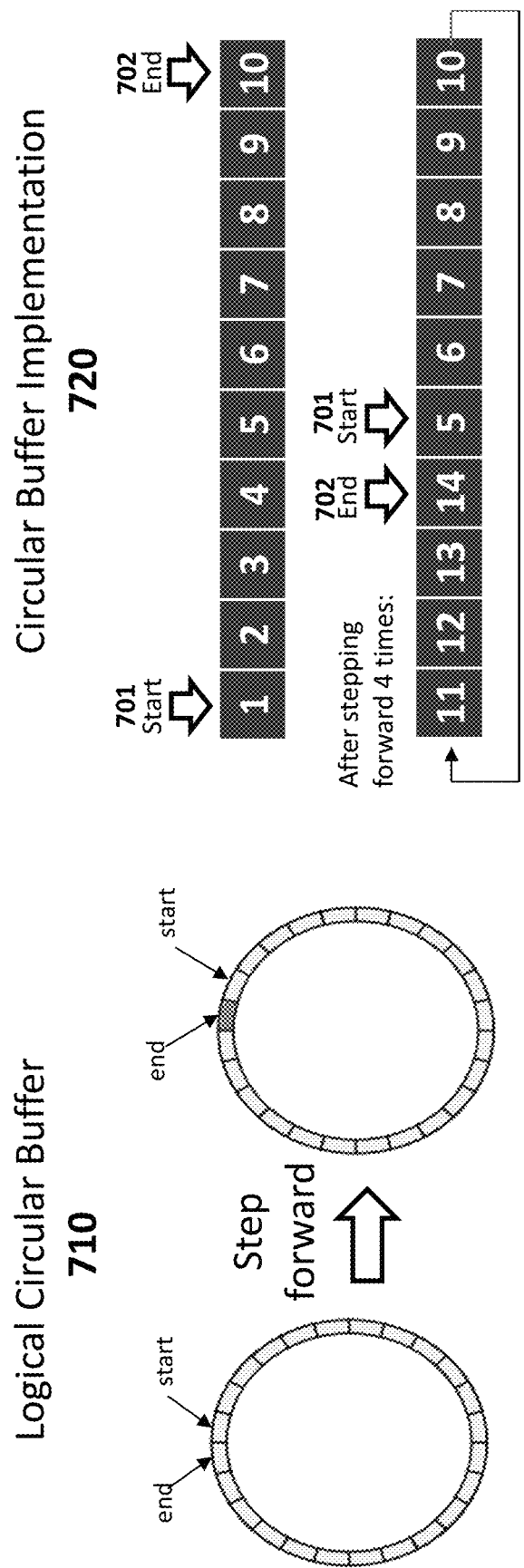
FIG. 7 illustrates a logical circular buffer and circular buffer implementation for the time dimension in a resource tensor, in accordance with embodiments.

FIG. 7 illustrates a logical circular buffer 710 and circular buffer implementation 720 for the time dimension in a resource tensor, in accordance with embodiments. According to embodiments, a circular buffer 710 may be used to encode the time dimension in a resource tensor. The time dimension can be regarded uniquely in a tensor representation as time steps forward with a certain increment or interval (e.g. every one minute). Thus, as time steps forward, all resource values may need to be updated. For example, what was previously two timesteps away from a certain time point will now only be one timestep away from the same time point. As such, resource values in the tensor need to be updated. However, updating all resource values in the tensor on every timestep is not desired as such an update would be computationally expensive.

To resolve this issue, a logical circular buffer 710 may be implemented for the time dimension in a resource tensor, for example implemented as the circular buffer implementation 720 illustrated in FIG. 7. In particular, a start pointer (e.g. start pointer 701) and an end pointer (e.g. end pointer 702) may be implemented and kept dynamically pointing to the 'start' and the 'end' of the time dimension values (or sub-array for time dimension values), respectively. On each update, new 'end' values for each host and resource can be inserted, extrapolated from past values, or predicted explicitly. The values of the start pointer and the end pointer may be rotated around the actual end of the time dimension values as needed whenever time steps forward. For example, referring to FIG. 7, the start pointer 701 may be pointing at the position 1 (e.g. array index 0) and the end pointer 702 may be pointing at the position 10 (e.g. array index 9). When time steps forward, the values for positions of the start pointer 701 and the end pointer 702 may be incremented. When a pointer is at the end of the time dimension values, the pointer, upon time stepping forward, will be carried over (e.g. wrap around) to the start of the time dimension values. For instance, after stepping forward 4 times (e.g. after 4 timesteps), the start pointer 701 moves from the position 1 to the position 5, and the end pointer 702 moved from the position 10 to the position 14, which is actually the position 4 of the in-memory linear buffer.

According to embodiments, a circular buffer for the time dimension in a resource tensor enables much faster update of values in the tensor when time steps forward. In some embodiments, the resource tensor update may be 'T' times faster, where the size of the time dimension is 'T'. The 'T' times faster update may be possible because the update is required only at one of the T timesteps instead of all T timesteps.

According to embodiments, resources may be represented using tensors for efficient scheduling operations. Scheduling operations may include (i) logically placing a request on a host, (ii) determining whether a request fits on a host, (iii) finding the best host on which to place the request, (iv) determining the number of times a request can fit on one or more hosts, and (v) resolving conflicts arising during scheduling operations. In various embodiments, scheduling operations may be performed using scientific (software) frameworks and libraries, such as NumPy and PyTorch.

According to embodiments, the scheduling operation of a request placement (e.g. placing a request on a host) may be performed more efficiently using tensor models. For example, when there is a resource-usage tensor with a shape of H×R×T and a request tensor with a shape of R×T, the placement of R×T request on the 'i'$^{th}$ host may be implemented as follows:

resources[i]+=request

OR resources[i]=resources[i]+request

Since both resources[i] and request have shape of R×T, the addition operation (e.g. '+') may revise the values in the R×T sub-array at position 'i' of the resource tensor. Scientific (software) frameworks or libraries, such as NumPy and PyTorch, may automatically compile the source code to perform the scheduling operation (e.g. request placement on a host) efficiently. In some embodiments, the source code may be more efficiently compiled on specialized hardware such as GPUs and Tensor-Processing Units (TPUs). As such, the placement of requests on a host can be more efficiently performed on specialized hardware such as GPUs and TPUs.

Once the requested work (e.g. request) is completed, the scheduling operation may proceed to remove the completed work from the 'i'$^{th}$ host and release resources thereof for other work requests. Removing the completed request from the 'i'$^{th}$ host may be implemented as follows:

resources[i]-=request

OR resources[i]=resources[i]-request

Figure 8:
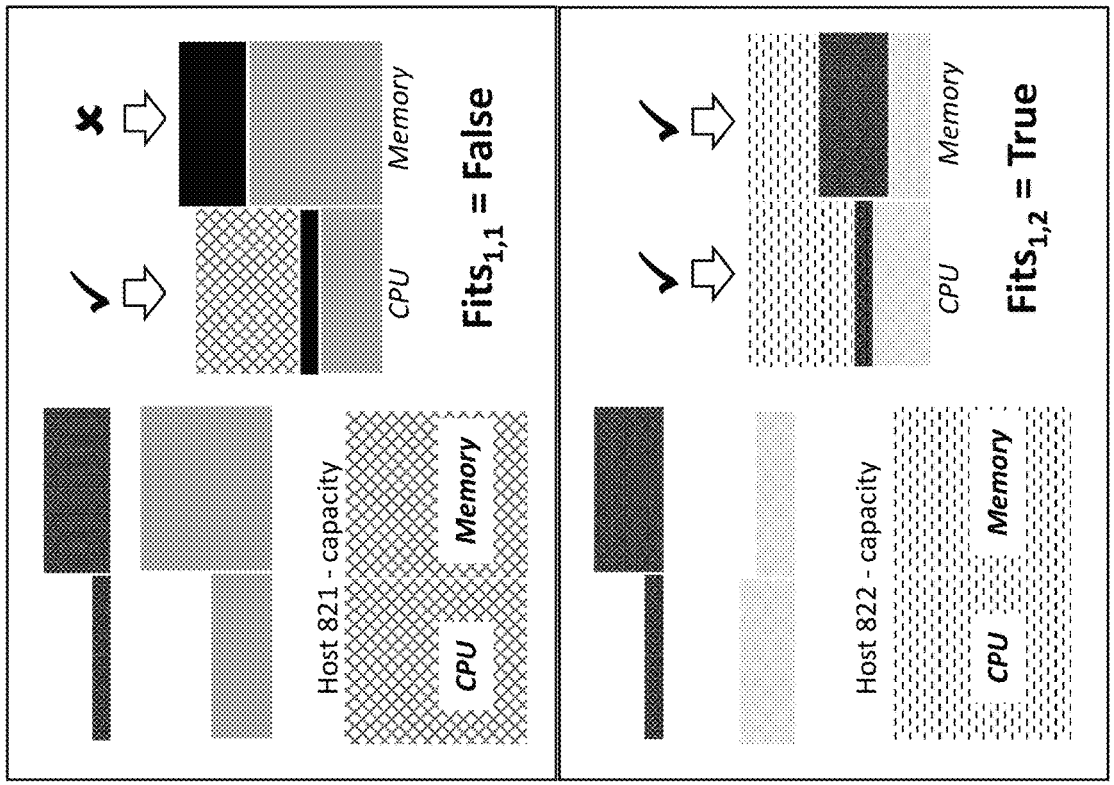
FIG. 8 illustrates a process by which a resource scheduler determines whether a request fits on a host, in accordance with embodiments.
Figure 8:
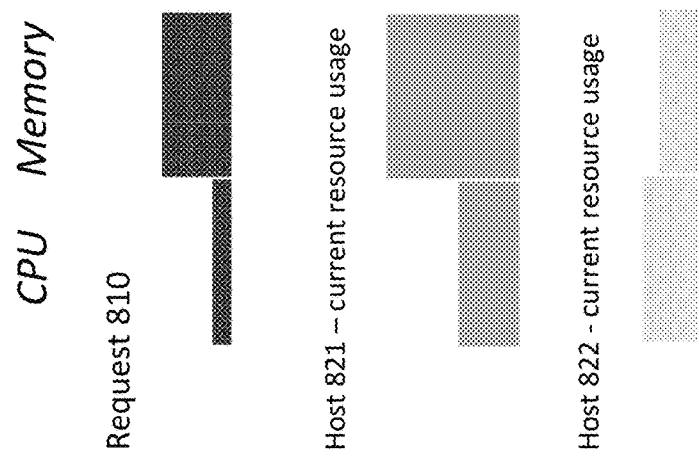

According to embodiments, tensor models may be used to more efficiently determine whether a request fits on one or more hosts during scheduling. In other words, tensor models allow the resource scheduler to efficiently find the subset of resources (here, at the host level) for which there is 'adequate' or sufficient resources to perform the request (here, to determine which hosts can accept the request). FIG. 8 illustrates an example of such determination with one request and two hosts. FIG. 8 illustrates a case without a time dimension. While not illustrated in FIG. 8, when the tensor has a time dimension, determining whether a request fits on a host may be repeated across all values in the time dimension.

Referring to FIG. 8, the resource amount requested by the request 810 and the current resource usage and total capacity may be provided for each of the hosts 821 and 822. The objective of this operation (e.g. determining whether the request fits on the host) is to find which host can accept the request. Whether the request fits on the host may be determined by finding out whether the sum of the resource amounts requested by the request, plus the current resource usage at the host, does not exceed the total capacity of the host, in any consumable resource dimension (e.g., CPU, memory, etc.). In the case of FIG. 8, as illustrated in the figure, the request 810 does not fit on the host 821 as the resource amount requested by the request 810 plus the current resource usage at the host 821 exceeds the total capacity of the host 821 in the memory dimension. On the other hand, the request 810 fits on the host 822 as the resource amount requested by the request 810 plus the currently resource usage at the host 822 does not exceed the total capacity of the host 821 in any resource dimension.

According to embodiments, determining whether a request fits on a host may be performed using a vectorized operation. In various embodiments, a single vectorized operation may be sufficient to implement determining whether multiple requests fit on multiple hosts across all timesteps. For example, when a resource tensor (e.g. resources in the code below) has a shape of H×R×T, a request tensor (e.g. request in the code below) has a shape of I×1×R×T (i.e., there are T requests in total), and the total-capacity tensor (e.g. resource_capacity in the code below) has a shape of H×R×1 (i.e., capacity is constant over time), determining whether each of the multiple requests fits on each of the multiple hosts can be simply implemented using a single command in NumPy as follows:

server fits=np.all(request+resources<=resource_capacity, axis=(2,3))

The output will be a tensor of Booleans with a shape of I×H. If the value of the output tensor at index (i, h) is 'True', the request T fits on the host 'h'. If the value of the output tensor at index (i, h) is 'False', the request T does not fit on the host 'h'. The example of the output tensor with a shape of I×H may look like the following. Each Fits$_{i,h}$ may hold Boolean value (e.g. True or False).

$$\begin{bmatrix} Fits_{1,1} & \cdots & Fits_{1,H} \\ \vdots & \ddots & \vdots \\ Fits_{I,1} & \cdots & Fits_{I,H} \end{bmatrix}$$

The above code illustrates the concept of 'broadcasting'. As mentioned above, the three tensors in the arithmetic operation "request+resources<=capacity" all have different dimensionality (I×1×R×T, H×R×T, and H×R×1, respectively). In order to perform the computation, in some embodiments, the source code implicitly broadcasts the requests across all the host dimensions, broadcasts the hosts across all the request dimensions, and broadcasts the capacities across both all requests and all timesteps. For example, when performing a scheduling operation where the request tensor and resource tensor are arguments to the operation, a resource scheduler or other computing device may efficiently and automatically (i) align the dimensions between the request and the resource tensors, (ii) broadcast (e.g.

logically copy) the request and resource tensor numeric values in order for the request tensor to implicitly have the same dimensionality as the resource tensor without actually copying data in memory, and (iii) perform the desired operations (e.g. adding the request numeric values to the resource numeric values). According to embodiments, broadcasting may bring some flexibility and efficiency to the tensor representation. For example, for fixed requests over time (i.e., static, non-dynamic requests), tensors of dimensionality R×1 may be used (instead of tensors of dimensionality R×T) and consumable resource values may be broadcast over all timesteps during scheduling operations. As another example, considering the complex resource tensor described earlier with a shape of D×K×H×G×R×T, the request tensor may not need to completely match the resource tensor in dimensionality in order to perform scheduling operations where the request tensor and this resource tensor are the arguments to the operation. If, for example, the request tensor has a shape of R×1, then the request tensor consumable resource values may be automatically broadcast across all composite resource dimensions (D, K, H, and G), and across all timesteps, during scheduling operations. There may be no actual copying of data, i.e., a request tensor of dimensionality D×K×H×G×R×T does not need to actually be instantiated in memory in order for the operation to proceed.

Referring to the source code above, the 'all' operation (e.g. np.all) may be used as the request needs all resources below the target level/dimension. The 'all' operation returns true only if 'all' the elements in the input tensor along a given dimension or set of dimensions (axis' or 'axes' in NumPy terminology) evaluate to true. In this case, the input tensor is the output of the addition and comparison operation (e.g. request+resources<=resource_capacity) and the axes to be used are the time and consumable resource dimensions. Referring to the source code above, the dimensions to be checked for truth are indicated by axis=(2,3)'.

The above source code may be regarded as a 'fully-vectorized' version of tensor-based scheduling as all requests and all hosts are simultaneously processed. The same function may be implemented using a 'for' loop wherein a single request is processed at each iteration (e.g. determining whether a request fits on each host but only for a single request at each iteration). The for-loop based approach may be regarded as a 'half-vectorized' version.

According to embodiments, tensor models may be used when determining the best host on which to place the request. When determining the best host on which to place the request, it may be desired to avoid the situation that consumable resources on the host are used up in one dimension but not in other dimensions. For instance, it may not be desired to use up all CPUs on a host while a large portion of memory remains available. In such a case, despite having a large amount of free memory capacity on a host, this capacity would be wasted as no new tasks can be placed on the host due to the fully-utilized CPU on that host. To avoid such inefficient resource usage, resource schedulers may perform request placement in a manner such that the total resource usage at a host, after placing a request, is similar to the total capacity of the host, in the sense of vector similarity.

According to embodiments, vector similarity between the total resource usage and the total capacity of the host can be found by calculating 'cosine similarity'. Cosine similarity may refer to the cosine value of the angle between two vectors in multi-dimensional space, with one vector representing the total resource usage at the host after placing the request and one vector representing the total capacity of that host. If the two vectors are close to each other (i.e., the resource usage at the host after placing the request, and the total capacity of that host, are similar to each other), the angle between the two vectors will be small and the cosine value of the angle will be close to 1. On the other hand, if the two vectors are far apart from each other (i.e., upon placing the request, the resource usage at one dimension in consideration of the total capacity of the resource at that dimension is much higher than the resource usage at the other dimension in consideration of the total capacity of the resource at that other dimension), the angle between the two vectors will be large and the cosine value of the angle will be close to 0.

Figure 9:
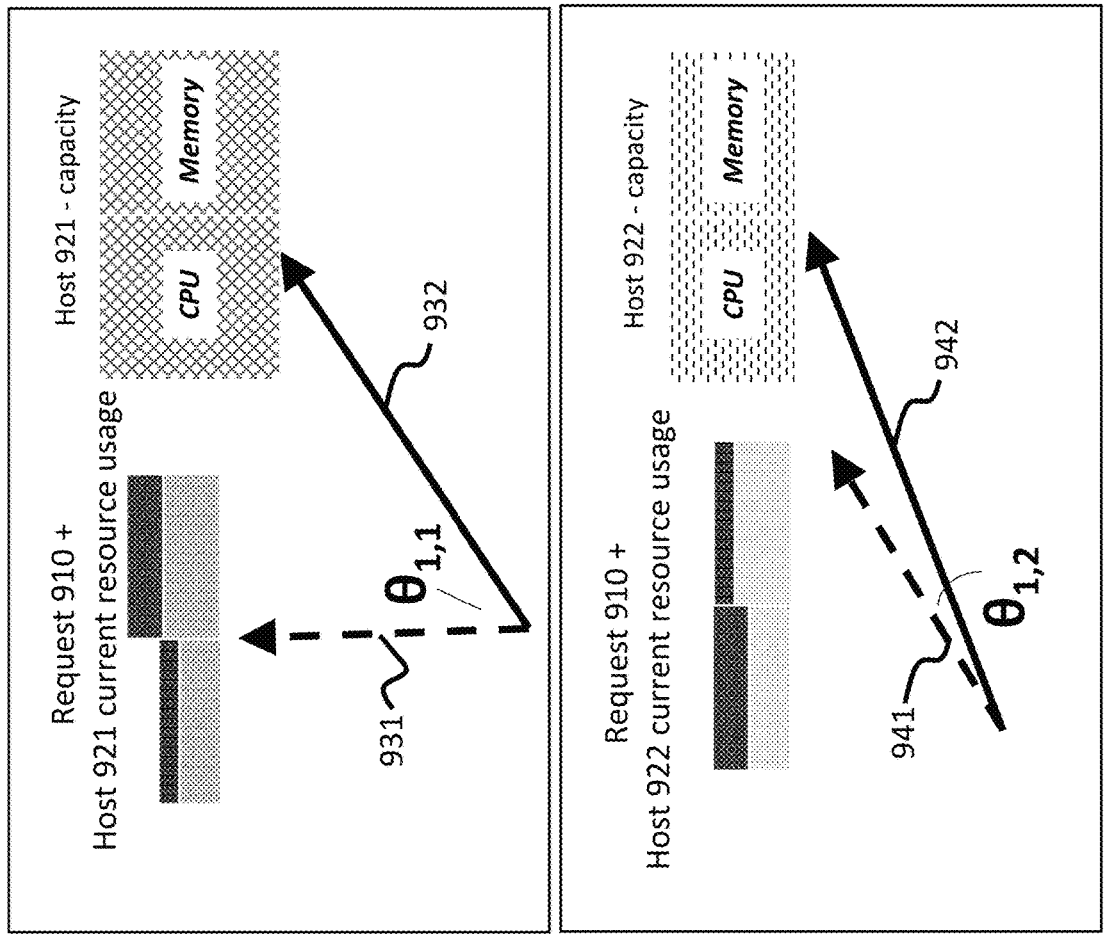
FIG. 9 illustrates a process determining the best host on which to place the request using cosine similarity, in accordance with embodiments.

FIG. 9 illustrates an example of determining the best host on which to place the request using cosine similarity, in accordance with embodiments. The objective of this operation is to find which host is the best host on which to place the request. According to embodiments, the best host may be determined by calculating cosine similarity between the total resource usage (e.g. total resource usage=requested amount+current resource usage at each host) and the total resource capacity at each host. The best host may be the host with the total capacity that is the most similar to the sum of the requested resource amount and the resource amount that is used by that host.

Referring to FIG. 9, the resource amount requested by the request 910 may be provided, while the current resource usage and total capacity may be provided for each of the hosts 921 and 922. The vector 931 represents the vector for the total resource usage of the host 921 (e.g. the resource amount requested by the request 910 plus the current resource usage at the host 921) and the vector 932 represents the vector for the total resource capacity of the host 921. Similarly, the vector 941 represents the vector for the total resource usage of the host 922 (e.g. the resource amount requested by the request 910 plus the current resource usage at the host 922) and the vector 942 represents the vector for the total resource capacity of the host 922. In order to find the best host on which to place the request (in this case either the host 921 or the host 922), cosine similarity between the total resource usage (e.g. requested amount plus host usage) and total resource capacity is calculated for all hosts (e.g. hosts 921 and 922). In this case, the cosine similarity for hosts 921 may be obtained by calculating cosine for the angle between the vectors 931 and 932. Similarly, the cosine similarity for hosts 922 may be obtained by calculating cosine for the angle between the vectors 941 and 942. Because the angle between the vectors 941 and 942 is smaller than the angle between the vectors 931 and 932, the cosine similarity for the host 922 would be greater than the cosine similarity for the host 921. As such, placing the request 910 on the host 921 would be better in terms of balancing resource usage across the dimensions in proportion to their capacity.

When there are I requests and J hosts, it may be desired to produce an I×J matrix (i.e., an I×J tensor of Floats) for cosine similarities when placing each request on each host. The cosine similarities may be calculated using the following 'half-vectorized' (i.e., one request at a time) source code in NumPy:

```
for each request:
    proposed=request+resources
    proposed_norm=torch.norm(proposed, dim=1)
```

```
cosine_dot=torch.einsum("ijk,ijm->i", proposed,
    resources_capac)
cosines[i]=cosine_dot/
    (proposed_norm*resources_capac_norm)
```

An example of the output tensor for the computed cosine similarities of all request (plus host usage) vectors and all host capacity vectors may look like the following. The output tensor may have a shape of I×J. Each $\cos\theta_{i,j}$ (e.g. i=1 . . . I and j=1 . . . J) may hold a Float value (e.g. 0.866025404) indicating the cosine of the angle between the request+usage and host capacity vectors.

$$\begin{bmatrix} \cos\theta_{1,1} & \cdots & \cos\theta_{1,J} \\ \vdots & \ddots & \vdots \\ \cos\theta_{I,1} & \cdots & \cos\theta_{I,J} \end{bmatrix}$$

Referring to the NumPy source code above, the last line of the code (e.g. cosine[i]=cosine_dot/(proposed_norm*resources_capac_norm)) equates to the following mathematic expression which demonstrates that the cosine value can be obtained by calculating the value of the dot product of the vectors divided by the norm of the each vector.

$$\text{similarity} = \cos(\theta) = \frac{A \cdot B}{\|A\|\|B\|} = \frac{\sum_{i=1}^{n} A_i B_i}{\sqrt{\sum_{i=1}^{n} A_i^2} \sqrt{\sum_{i=1}^{n} B_i^2}}$$

Referring to the NumPy source code above, the 'einstein summation' operation (e.g. torch.einsum) is used to compute the dot product over all consumable resources and timesteps. This dot product then becomes the numerator in the expression in the last line of code, described above.

According to embodiments, the 'half-vectorized' version of the source code shown above may be parallelized by dividing the requests (and thus the corresponding cosine similarity calculation performed at each iteration) across multiple CPUs and GPUs, in that each CPU or GPU can do the work of some portion of the iterations in the loop. This may result in a faster calculation of the entire I×J cosine similarity output matrix.

According to embodiments, using cosine similarity is one way of performing a 'best fit' operation (e.g. determining the best host on which to place a request) that can be employed in resource scheduling. Alternatively, in other embodiments, it may be desirable that the requests are "spread out" as much as possible in order to keep resource usage as flat as possible. Calculating "best fit" using a "spread out" criteria may be also easily vectorized. For instance, the norm of the total (i.e., aggregate) resource usage at each host may be calculated to see the resource amount that each host is using. There are several ways to efficiently re-calculate the aggregate resource usage at each host as time steps forward, such as subtracting and adding only the values removed or deleted by the step forward in time. Once the norm of each host's resource usage is calculated, the request may be placed on the least-used host (i.e., the host using the least amount of resources). Here, the least-used host may be the host with the smallest norm.

In addition to cosine similarity and 'least used' scoring of hosts for determining "best fit" scores, a worker skilled in the art would readily understand that there are other possible ways to perform a 'best fit' calculation when using the resource and request tensors according to embodiments. In this application, the 'scores' may be regarded as measures of the 'extent of suitableness' of using a given resource as a host for the given work request.

According to some embodiments, the resource scheduler may pre-compute (i.e., "predetermine") the cosine similarity score between all possible proposed placements (i.e., all possible total resource usages, which is all possible requested amounts plus host usages) and the total resource capacity on every host. Each of the pre-computed cosine similarity scores may be stored in a score function tensor. Essentially, the score function tensor may provide the value for every possible request placement including proposed placements currently non-existing in the cluster. For example, in some embodiments, the score function may be pre-computed for all possible resource combinations (e.g. all possible CPU and Memory combinations: <1 Core, 1 GB>, <1 Core, 2 GB>, <2 Core, 1 GB>, <2 Core, 2 GB>, etc.).

Once the pre-computed cosine similarity scores are stored in the score tensor, the score tensor may be indexed (in a vectorized manner) using the corresponding request placements thereby efficiently yielding cosine similarity scores for all proposed request placements.

In some embodiments, the pre-computed scores may be accessed to find the 'best fit' on a host as demonstrated using the following NumPy source code:

```
for each request:
    proposed=request+resources
    proposed_indices=np.split (proposed, proposed.shape
        [-1], axis=-1)
    proposed_scores=scoring_tensor[proposed_indices]
    placement spot=proposed_scores.argmax( )
```

Referring to the source code above, the proposed request placement (i.e., "proposed") may be obtained in the same way as obtained in the half-vectorized NumPy source code which calculates cosine similarity for each request. The obtained proposed request placement (i.e., "proposed") would be converted into a multi-dimensional index. This multi-dimensional index (i.e., proposed_indices) may be obtained by splitting the proposed request placement along the final resource dimension. In various embodiments, the multi-dimensional index may be simply obtained using the 'split' function provided by NumPy, as shown above, while there are other alternative ways (e.g., methods that get a 'view' of the resources grouped by the consumable resource dimension, as opposed to copying them into a new array). The multi-dimensional index (e.g. proposed_indices) may be used to retrieve the corresponding cosine similarity score for every proposed request placement. The resource scheduler may place the request on the host where the proposed request placement scores the highest (e.g., if the scoring_tensor encodes cosine similarities, then this would be the host with the highest cosine similarity score). The steps illustrated above may be repeated for each request.

There are a few reasons to use a pre-computed score function for determining the best host on which to place a request. The main reason is that it is more efficient to compute scores once and cache them for future retrieval, rather than to re-calculate them many times during resource scheduler operation. Another reason is flexibility—for instance, when a switch from cosine similarity to the 'least used' scoring function is needed, a corresponding change of source code for scheduling is not required; the change in scoring function can be simply accomplished by loading the score tensor pre-computed with the 'least used' scoring function into the resource scheduler as a replacement for the cosine similarity function.

It should be noted that pre-computing all the scores may be feasible only when there are a limited number of possible scores, and this limitation arises only when there are a limited number of possible combinations of resource values in the distributed computing system. In various embodiments, requested work may be drawn from a finite number of "flavours" or from discrete options for CPU and Memory requirements. As such, a discrete and finite number of request placements can be possibly proposed (e.g. existing resource usage plus the request resource amount). Since at most a score for each possible proposed placement is needed, there are a finite number of possible scores that need to be pre-computed prior to scheduling beginning. In some embodiments, on the other hand, only a subset of the scores is pre-computed.

According to embodiments, tensor models may be used when determining the number of times a work request can fit on one or more hosts. For example, an operator of a system may wish to ascertain how many work requests, of a particular, specified resource requirement, could be successfully placed, given the current resource availability. E.g., the operator of the system may wish to know whether or not 100 VMs, each needing 1 CPU and 2 GB of memory, could all be placed into the distributed computing system. Tensor models enable this quantity to be calculated in a computationally-efficient manner using vectorized operations. Tensor models also enable this quantity to be efficiently calculated for a number of different work requests, in parallel, using vectorized operations.

According to embodiments, tensor models may be used when resolving conflicts arising during scheduling operations. When scheduling, there may be no conflict if only one request is placed at one time (i.e., the half-vectorized versions described above). However, if multiple requests are placed in parallel or request placement is processed in batches (i.e., using the fully-vectorized versions of operations), parallelized scheduling may result in conflicts. For instance, when two requests have the best fit on the same host, conflict may arise if only one of the two requests can be fit on that host. Therefore, an algorithm to resolve the conflicts may be needed after finding out whether requests individually fit on each host or after determining the individual best host on which to place each request. As such, in various embodiments, a conflict resolution mechanism may be needed.

There may be several ways to resolve conflicts arising during scheduling operations. In some embodiments, when a conflict between one or more requests arises, the resource scheduler may arbitrarily pick a winner request and re-schedule the loser requests later. In some embodiments, the resource scheduler may use a special conflict resolution algorithm which is parallelizable. One such parallelizable conflict resolution algorithms is the Parallelized Asymmetric Auction Algorithm proposed by Bertsekas and Castanon (Bertsekas, Dimitri P., and David A. Castanon. "Parallel synchronous and asynchronous implementations of the auction algorithm." *Parallel Computing* 17.6-7 (1991): 707-732). The proposed algorithm solves the assignment problem by finding an optimal assignment of requests to hosts. It works by having the requests iteratively 'bid' in parallel for how much they want to be placed on each host, and iteratively letting each host pick the request that made the highest bid. These iterations will be repeatedly executed until the final solution is found.

According to embodiments, there are potential advantages to using tensors when implementing scheduling operations. One potential advantage is that scheduling operations can be implemented with very concise, easy-to-read and clear source code. Scheduling operations can often be implemented with a single line of source code instead of complicated statements in nested for-loops. Another potential advantage of using tensors is that the scientific (software) frameworks and libraries, such as NumPy and PyTorch, may have built-in capabilities to convert source code into vectorized instructions that can run efficiently on processing units (e.g. CPUs). The converted instructions may run even more efficiently on specialized hardware such as GPUs and TPUs.

According to embodiments, scheduling using tensors may leverage specialized hardware to execute the scheduling operations. For instance, modern GPUs, TPUs and other specialized AI chips may be optimized for tensor processing operations. By encoding the scheduling operations with tensors, the specialized hardware may be (automatically) exploited to parallelize scheduling operations and more efficiently run the scheduling operation algorithms. The scientific (software) frameworks and libraries may also use or allow to use of parallelized machine instructions and hardware. For example, NumPy compiles the Python code into underlying C code and further compiles the underlying C code to exploit SIMD instructions (e.g. Intel® AVX) if the machine supports those instructions. The SIMD instructions run much faster than pure Python code. PyTorch can allocate and update tensors on GPU memory and also (automatically) exploit GPU parallelism for further improvement on speed versus NumPy on Intel AVX. Tensor resource models may be further deployed on specialized AI hardware or tensor processing hardware (e.g. TPUs) or other AI Accelerator chips.

According to embodiments, resources for scheduling in a distributed computing system can be modeled using a tensor, i.e., a multi-dimensional (hierarchical) array with a uniform data type. The tensor can express hierarchical relationships between different resources. In particular, using a tensor may, especially when encoding the time dimension as a circular buffer. In some embodiments, one or more separate tensors for past and future time may be used (e.g. when values from the past time are used to forecast the future values).

According to embodiments, all of resource usage, resource capacity, remaining or available resources, requested resources and resource used by each tenant in the system may be encoded using tensors. Upon representing resources using tensors, standard scheduling operations can be implemented using tensor operations (e.g. tensor arithmetic, with broadcasting). Some examples of the scheduling operation that can be implemented using tensor may be placing a request on a host, calculating where a request can fit, determining the best host on which to place a request and resolving conflict made by parallel scheduling operations. These scheduling operations and the corresponding tensors may be placed and executed on specialized hardware like special vectorized CPUs, GPUs, TPUs or other specialized processing units. In various embodiments, the aforementioned scheduling operations and tensor resource modelling may be done in a distributed computing system (e.g. where the resource scheduler performs distributed resource management).

Figure 10:
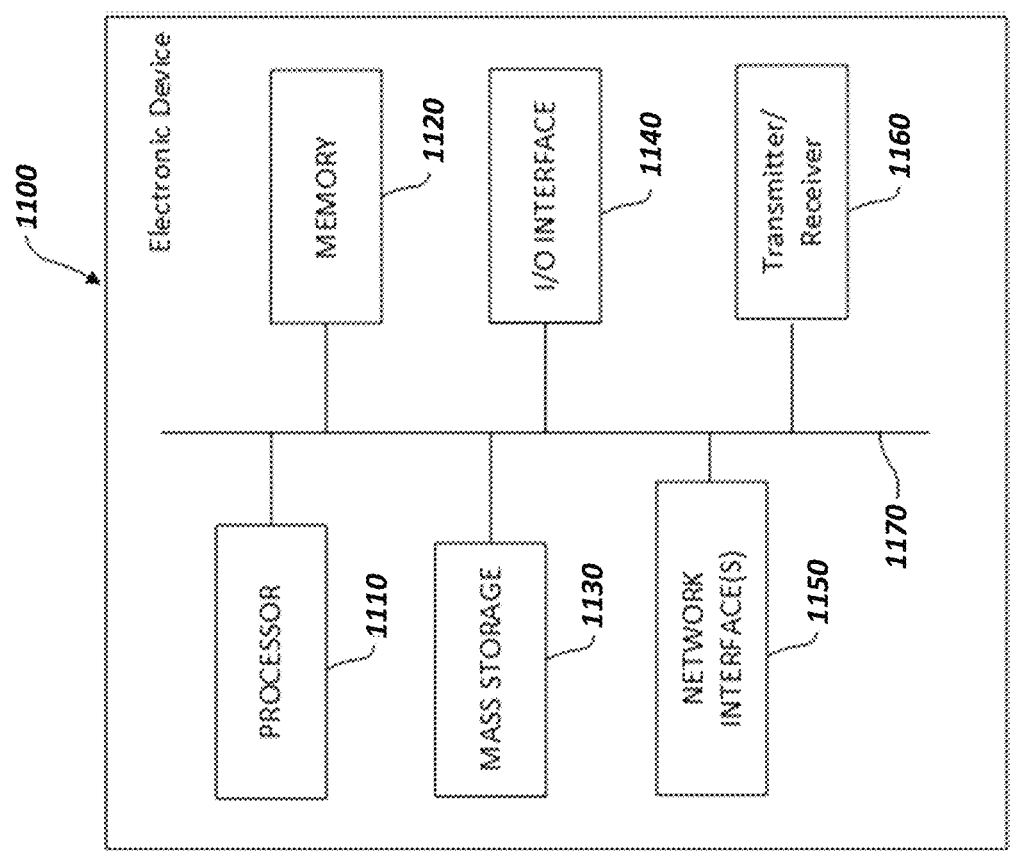
FIG. 10 illustrates, in a schematic diagram, an electronic device in accordance with embodiments.

FIG. 10 is a schematic diagram of an electronic device 1100 that may perform any or all of operations of the above methods and features explicitly or implicitly described herein, according to different embodiments of the present invention. For example, a UE, such as a mobile phone, smart phone, a computer equipped with network function, network node or Machine Type Communications (MTC) device, may be configured as electronic device 1100. Further, a computing device comprising resource schedulers, and a resource server in the datacenter described herein may be configured as the electronic device 1100.

As shown, the device includes a processor 1110, such as a Central Processing Unit (CPU) or specialized processors such as a Graphics Processing Unit (GPU) or other such processor unit, memory 1120, non-transitory mass storage 1130, I/O interface 1140, network interface 1150, and a transceiver 1160, all of which are communicatively coupled via bi-directional bus 1170. According to certain embodiments, any or all of the depicted elements may be utilized, or only a subset of the elements. Further, the device 1100 may contain multiple instances of certain elements, such as multiple processors (including a mix of CPUs and specialized processors), memories, or transceivers. Also, elements of the hardware device may be directly coupled to other elements without the bi-directional bus. Additionally or alternatively to a processor and memory, other electronics, such as integrated circuits, may be employed for performing the required logical operations.

The memory 1120 may include any type of non-transitory memory such as static random access memory (SRAM), dynamic random access memory (DRAM), synchronous DRAM (SDRAM), read-only memory (ROM), any combination of such, or the like. The mass storage element 1130 may include any type of non-transitory storage device, such as a solid state drive, hard disk drive, a magnetic disk drive, an optical disk drive, USB drive, or any computer program product configured to store data and machine executable program code. According to certain embodiments, the memory 1120 or mass storage 1130 may have recorded thereon statements and instructions executable by the processor 1110 for performing any of the aforementioned method operations described above.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Acts associated with the method described herein can be implemented as coded instructions in plural computer program products. For example, a first portion of the method may be performed using one computing device, and a second portion of the method may be performed using another computing device, server, or the like. In this case, each computer program product is a computer-readable medium upon which software code is recorded to execute appropriate portions of the method when a computer program product is loaded into memory and executed on the microprocessor of a computing device.

Further, each operation of the method may be executed on any computing device, such as a personal computer, server, personal digital assistant (PDA), or the like and pursuant to one or more, or a part of one or more, program elements, modules or objects generated from any programming language, such as C++, Java, or the like. In addition, each operation, or a file or object or the like implementing each said operation, may be executed by special purpose hardware or a circuit module designed for that purpose.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. A method for managing and scheduling one or more resources in a distributed computing system, the method comprising:
representing availability of the resources or usage of the resources in the distributed computing system using one or more resource tensors, each resource tensor comprising a multi-dimensional resource array having a uniform data type, wherein at a lowest dimension of the multi-dimensional resource array, the multi-dimensional resource array contains information indicative of an amount of available resources or an amount of used resources;
receiving one or more requests for the resources, each request for the resources specifying the resources in the distributed computing system required to satisfy a work request of the one or more requests;
representing the requests for resources as one or more request tensors, each request tensor comprising a multi-dimensional request array having a uniform data type, wherein at a lowest dimension of the multi-dimensional request array, the multi-dimensional request array contains information indicative of an amount of requested resources;

scheduling the resources in the distributed computing system in accordance with the one or more resource tensors and the one or more request tensors, wherein scheduling includes placing the work request on a subset of one or more resources that are available; and completing the work request using the subset of one or more resources that are available;

wherein the resources have a hierarchical relationship, wherein the resources at a second level of the hierarchical relationship contain resources at a first level of the hierarchical relationship, and an order of dimensions in the one or more resource tensors represents the hierarchical relationship, such that the resources in one dimension contain the resources in a subsequent dimension.

2. The method of claim 1 further comprising:
representing a total amount of the resources in the distributed computing system using one or more capacity tensors; and
wherein scheduling resources in the distributed computing system is further in accordance with the one or more capacity tensors.

3. The method of claim 2, wherein scheduling further comprises at least in part operations using a vectorized tensor broadcasting operation on the one or more resource tensors, the one or more request tensors, or the one or more capacity tensors.

4. The method of claim 1 further comprising,
during scheduling, updating the one or more resource tensors based on values in the one or more request tensors in response to a condition, wherein the condition is one of:
placement of the work request on the subset of one or more resources that are available,
completion of the work request using the subset of one or more resources that are available, or
release of the one or more resources requested by the work request.

5. The method of claim 1 further comprising determining a subset of the one or more resource tensors that has sufficient capacity for the work request.

6. The method of claim 1, further comprising determining a subset of the one or more resource tensors that is a best fit for requested resources, wherein the best fit is determined based at least on calculating an extent of suitableness score for each subset of the one or more resource tensors when placing the work request on the requested resources.

7. The method of claim 6, wherein the extent of suitableness score for each of the subset of the one or more resource tensors is determined based on similarity between total resource usage upon placement of the request thereon and total capacity of the resources.

8. The method of claim 6, wherein the extent of suitableness score is predetermined.

9. The method of claim 1, further comprising determining a total number of times that the work request can be placed on the subset of resources that are available or another subset of resources that are available.

10. The method of claim 1, wherein scheduling further comprises:
resolving conflicts arising when placing the work request on the subset of the one or more resources that are available.

11. The method of claim 1, wherein the resources at a dimension of the one or more resource tensors represent values at different timesteps defining a time dimension.

12. The method of claim 11, wherein the timesteps of the time dimension are stored in a circular buffer.

13. The method of claim 1, wherein the one or more resource tensors include one or more of: one or more resource tensors for past resource usage and one or more resource tensors for future resource usage.

14. An apparatus for managing and scheduling one or more resources in a distributed computing system, the apparatus comprising;
a processor; and
a memory storing machine executable instructions, the instructions when executed by the processor configure the apparatus to:
represent availability of the resources or usage of the resources in the distributed computing system using one or more resource tensors, each resource tensor comprising a multi-dimensional resource array having a uniform data type, wherein at a lowest dimension of the multi-dimensional resource array, the multi-dimensional resource array contains information indicative of an amount of available resources or an amount of used resources;
receive one or more requests for the resources, each request for the resources specifying the resources in the distributed computing system required to satisfy a work request of the one or more requests;
represent the requests for the resources as one or more request tensors, each request tensor comprising a multi-dimensional request array having a uniform data type, wherein at a lowest dimension of the multi-dimensional request array, the multi-dimensional request array contains information indicative of an amount of requested resources;
schedule the resources in the distributed computing system in accordance with the one or more resource tensors and the one or more request tensors, wherein scheduling includes placing the work request on a subset of one or more resources that are available; and
complete the work request using the subset of one or more resources that are available;
wherein the resources have a hierarchical relationship, wherein the resources at a second level of the hierarchical relationship contain resources at a first level of the hierarchical relationship, and an order of dimensions in the one or more resource tensors represents the hierarchical relationship, such that the resources in one dimension contain the resources in a subsequent dimension.

15. The apparatus of claim 14, wherein the instructions when executed by the processor further configure the apparatus to:
represent a total amount of the resources in the distributed computing system using one or more capacity tensors, and
schedule using the one or more resource tensors, the one or more request tensors, and the one or more capacity tensors.

16. The apparatus of claim 14, wherein the instructions when executed by the processor further configure the apparatus to:

during scheduling, update the one or more resource tensors based on values in the one or more request tensors in response to a condition, wherein the condition is one of:
placement of the work request on the subset of one or more resources that are available,
completion of the work request using the subset of one or more resources that are available, or
release of the one or more resources requested by the work request.

17. The apparatus of claim 14, wherein the instructions when executed by the processor further configure the apparatus to determine a subset of the one or more resource tensors that is a best fit for the requested resources, wherein the best fit is determined based at least on calculating an extent of suitableness score for each subset of the one or more resource tensors when placing the work request on the requested resources.

18. The apparatus of claim 17, wherein the extent of suitableness score for each of the subset of the one or more resource tensors is determined based on similarity between total resource usage upon placement of the work request thereon and total capacity of the resource.

19. A network node for managing and scheduling resources in a distributed computing system, the network node comprising:
a network interface for receiving data from and transmitting data to components connected to the distributed computing network;
a processor; and
a non-transient memory for storing instructions that when executed by the processor cause a network function to be configured to:
represent availability of the resources or usage of the resources in the distributed computing system using one or more resource tensors, each resource tensor comprising a multi-dimensional resource array having a uniform data type, wherein at a lowest dimension of the multi-dimensional resource array, the multi-dimensional resource array contains information indicative of an amount of available resources or an amount of used resources;
receive one or more requests for resources, each request for the resources specifying the resources in the distributed computing system required to satisfy the request;
represent the requests for the resources as one or more request tensors, each request tensor comprising a multi-dimensional request array having a uniform data type, wherein at a lowest dimension of the multi-dimensional request array, the multi-dimensional request array contains information indicative of an amount of requested resources;
schedule the resources in the distributed computing system in accordance with the one or more resource tensors and the one or more request tensors, wherein scheduling includes placing the work request on a subset of one or more resources that are available; and complete the work request using the subset of one or more resources that are available;
wherein the resources have a hierarchical relationship, wherein the resources at a second level of the hierarchical relationship contain resources at a first level of the hierarchical relationship, and an order of dimensions in the one or more resource tensors represents the hierarchical relationship, such that the resources in one dimension contain the resources in a subsequent dimension.

\* \* \* \* \*

UNITED STATES PATENT AND TRADEMARK OFFICE
CERTIFICATE OF CORRECTION

PATENT NO. : 11,907,770 B2
APPLICATION NO. : 16/575763
DATED : February 20, 2024
INVENTOR(S) : Shane Anthony Bergsma et al.

Page 1 of 1

It is certified that error appears in the above-identified patent and that said Letters Patent is hereby corrected as shown below:

In the Specification

Column 13, Line 11, "to check for each single request (i.e. 1=1). If there are 500" should read --to check for each single request (i.e. I=1). If there are 500--;

Column 13, Line 12, "work requests (i.e. 1=500) to be scheduled, the resource" should read --work requests (i.e. I=500) to be scheduled, the resource--;

Column 20, Line 42, "the request 'T' fits on the host 'h'. If the value of the output tensor" should read --the request 'i' fits on the host 'h'. If the value of the output tensor--;

Column 20, Line 43, "at index (i, h) is 'False', the request 'T' does not fit on the host" should read --at index (i, h) is 'False', the request 'i' does not fit on the host--.

Signed and Sealed this
Fourteenth Day of May, 2024

Katherine Kelly Vidal
*Director of the United States Patent and Trademark Office*